(12) United States Patent
Jia et al.

(10) Patent No.: US 11,665,319 B2
(45) Date of Patent: May 30, 2023

(54) AUGMENTED REALITY DISPLAY DEVICE, AND APPARATUS COMPRISING SAME

(71) Applicant: Longan Vision Corp., Hamilton (CA)

(72) Inventors: Enzo (Mingpo) Jia, Hamilton (CA); Yizhou Zhao, Hamilton (CA); Anzhou Xing, Hamilton (CA); Qibo Kong, Hamilton (CA); Yuanming Cao, Hamilton (CA); Alex Shortt, Hamilton (CA)

( * ) Notice: Subject to any disclaimer, the term of this patent is extended or adjusted under 35 U.S.C. 154(b) by 0 days.

(21) Appl. No.: 17/419,503

(22) PCT Filed: Jan. 15, 2020

(86) PCT No.: PCT/CA2020/050036
§ 371 (c)(1),
(2) Date: Jun. 29, 2021

(87) PCT Pub. No.: WO2013/098366
PCT Pub. Date: Jul. 4, 2013

(65) Prior Publication Data
US 2022/0094883 A1    Mar. 24, 2022

Related U.S. Application Data

(60) Provisional application No. 62/792,427, filed on Jan. 15, 2019.

(51) Int. Cl.
*H04N 7/18* (2006.01)
*A42B 3/04* (2006.01)
(Continued)

(52) U.S. Cl.
CPC ............. *H04N 7/183* (2013.01); *A42B 3/042* (2013.01); *H04N 5/33* (2013.01); *H04N 9/3173* (2013.01)

(58) Field of Classification Search
CPC ........ H04N 7/183; H04N 5/33; H04N 9/3173; A42B 3/042; G09G 2340/10;
(Continued)

(56) References Cited

U.S. PATENT DOCUMENTS 9,039,228 B1 * 5/2015 McCorkle ........... F21V 21/0885
362/191
10,082,865 B1 * 9/2018 Raynal ............... G02B 27/0093
(Continued)

FOREIGN PATENT DOCUMENTS

JP     2004205711 A  *  7/2004
WO   2013098366       7/2013
WO   2014152746       9/2014

*Primary Examiner* — Michael Lee
(74) *Attorney, Agent, or Firm* — Renner, Kenner, Greive, Bobak, Taylor & Weber

(57) ABSTRACT

An augmented reality display device, includes: a display unit including a thermal camera configured to capture image frames, an image projector, and a display screen; a processing unit including processing structure in communication with the thermal camera and the image projector, the processing structure being configured to process the captured image frames and output processed image frames to the image projector, and a battery; and a strap connecting the display unit and the processing unit.

12 Claims, 21 Drawing Sheets

(51) Int. Cl.
*H04N 5/33* (2023.01)
*H04N 9/31* (2006.01)

(58) Field of Classification Search
CPC ........... G09G 2340/14; G09G 2354/00; G09G 3/003; G09G 5/377; G09G 2360/144; G02B 2027/0138; G02B 2027/014; G02B 27/0172
See application file for complete search history.

(56) References Cited

U.S. PATENT DOCUMENTS

| | | | | |
|---|---|---|---|---|
| 2010/0123961 | A1* | 5/2010 | Bauer, Jr. | G02B 7/1824 |
| | | | | 2/209.13 |
| 2010/0141555 | A1* | 6/2010 | Rorberg | H04N 5/772 |
| | | | | 348/241 |
| 2013/0201081 | A1* | 8/2013 | Evans | G02B 27/017 |
| | | | | 345/8 |
| 2016/0081415 | A1* | 3/2016 | Handshaw | A42B 3/046 |
| | | | | 2/5 |
| 2018/0003972 | A1* | 1/2018 | Kress | G02B 27/0172 |
| 2019/0018567 | A1* | 1/2019 | Murphy | G06F 3/0346 |
| 2020/0151449 | A1* | 5/2020 | Cossman | H04Q 9/00 |
| 2020/0151859 | A1* | 5/2020 | Long, II | G06T 5/40 |

\* cited by examiner

AUGMENTED REALITY DISPLAY DEVICE, AND APPARATUS COMPRISING SAME

FIELD OF THE INVENTION

The present invention relates generally to augmented reality and in particular, to an augmented reality display device and an apparatus comprising the same.

BACKGROUND OF THE INVENTION

In the field of augmented reality, augmented reality devices are worn by a user to provide the user with an interactive experience of a real-world environment, in which objects that reside in the real world are enhanced by computer-generated perceptual information. The computer-generated perceptual information can be any of visual information, auditory information, haptic information, and the like.

Visual augmented reality devices typically comprise one or more imaging devices and/or optical sensors that output information that is processed and combined with or "overlaid on" an image of the real world. The combined image is usually displayed on goggles or eyewear worn by the user.

For example, International PCT Application Publication No. WO 2013098366 to Luong et al. describes an apparatus for viewing augmented reality, comprising: a mask comprising a frame comprising a body onto which an inextensible strip is mounted, the latter defining a surface for bearing on the face of a user, and a strap for holding the frame on the face of the user, with the bearing surface thereof bearing on the face around the eyes; and at least one optical device comprising a semitransparent screen attached to the frame and opposite the eye of the user, and a projection system attached to the frame, said projection system being suitable for ensuring the projection of an augmented reality image onto the semitransparent screen, characterized in that it is free of any means for adjusting the position of the screen relative to the bearing surface when the mask is placed on the face of a user, and in that the relative positions of the screen, the bearing surface, and the projection system are translatably and rotatably invariant in all of the six degrees of freedom, regardless of the position of the mask on the face of the user, such that the position of the exit pupil of the optical device relative to the user is only adjusted by moving the mask relative to the face of the user.

Conventional augmented reality goggles or eyewear are generally bulky and are typically not physically compatible with headwear or facial items worn by the user, such as a helmets, breathing apparatuses, and the like.

Improvements are generally desired. It is therefore an object of the present invention at least to provide a novel augmented reality display device and an apparatus comprising the same.

SUMMARY OF THE INVENTION

It should be appreciated that this summary is provided to introduce a selection of concepts in a simplified form that are further described below in the detailed description. This summary is not intended to be used to limit the scope of the claimed subject matter.

Thermal imaging is a technique to overcome low light and poor visibility. Existing thermal imaging augmented reality systems for firefighters are limited in compatibility with existing firefighter helmets and self-contained breathing apparatus (SCBA). Certain other augmented reality systems add virtual elements to the real environment for training and simulation purposes, but do not aid in identifying and locating people in the real environment.

Accordingly, there is a need for an augmented reality display system that is compatible with any existing firefighter helmet and SCBA allowing a user to see an augmented reality view of the environment to more easily identify and locate distressed persons.

To address this need, the present invention provides a method for firefighters to identify and locate people in a burning building where low light, dust, smoke and debris can obscure the firefighter's view of the surroundings. The method described herein combines thermal imaging with edge detection image processing to specifically highlight human temperature objects in the firefighter's field of view, allowing for quick identification and location of persons in poor visibility environments.

Also disclosed herein is an augmented reality display system and mounting assembly that is compatible with existing firefighter helmets and SCBA without modification.

Headgear mounted visual display systems may have to be integrated into headgear by OEM manufacturers. These display systems may lack wide compatibility and may not be used as add-ons with standalone headgear and self-contained breathing apparatus (SCBA) in use today.

Disclosed herein, is an augmented reality (AR) display system that is compatible with a variety of protective or functional headgear without having to modify the headgear to accept the display system.

Accordingly, in one aspect, there is provided an augmented reality visual display system for attaching to headgear, the display system comprising: an augmented reality display unit; a thermal imaging camera within the display unit for capturing a thermal view of the environment corresponding to the user's field of view; a display screen attached to the display unit for displaying augmented reality information; a mounting assembly attached to the display unit for removably attaching the display system to the headgear so that the display screen is positioned in front of the user's eyes; an image processing system coupled to the camera and the display screen, for receiving the thermal view from the camera, identifying human temperature objects in the thermal view and outputting the human temperature objects to the display screen so that the user sees an augmented reality view of human temperature objects in the environment.

The thermal imaging camera may be proximate to the user's eyes and pointed away from the user. The display screen may be transparent allowing the user to view the environment through the display screen. The mounting assembly may attach the display system to the headgear on the outside of a self-contained breathing apparatus mask worn by the user. The mounting assembly may include at least one connector for removably attaching the display system to the headgear. The display system may further comprise a GPS transceiver. The display system may further comprise a gyroscope. The display system may further comprise wireless network connectivity. The augmented reality output may be wirelessly transmitted to a remote location, wherein the augmented reality output may be transmitted and stored on a media storage device.

In another aspect, there is provided a mounting assembly for attaching a display screen to a headgear, the assembly comprising: at least one connector for removably attaching to the headgear; a display mount secured to the connector.

The display mount may be pivotally attached to a display screen, such that the screen is positioned in front of the user's eyes and translates vertically with respect to the display mount. The display screen may be attached to the display mount by two parallel arms having opposable ends, the first end of each arm being pivotally connected to the display screen, the second end of each arm being pivotally connected to the display mount. The connector may be capable of attaching to an exposed surface of the headgear. The display mount may comprise a support positioned perpendicular to the brim of the headgear and a base positioned parallel to the brim of the headgear, wherein the connector may be capable of securing to the base of the display mount at various points more proximate or distal to the center of the base.

In another aspect, there is provided a firefighting method for identifying and locating human temperature objects comprising: capturing a thermal view of the environment; identifying objects in the thermal view; creating a virtual view of objects identified in the thermal view; overlaying the thermal view and the virtual view to create a fusion view; identifying objects in the fusion view with a thermal value corresponding to human body temperature; outputting the identified human temperature objects to a display screen.

The thermal view may be corrected for ambient temperature in the environment. The display screen may be transparent. The identification of human temperature objects in the fusion view may be accomplished by comparison against a pre-calibrated thermal value.

In still another aspect, there is provided an augmented reality display device, comprising: a display unit comprising a thermal camera configured to capture image frames, an image projector, and a display screen; a processing unit comprising processing structure in communication with the thermal camera and the image projector, the processing structure being configured to process the captured image frames and output processed image frames to the image projector, and a battery; and a strap connecting the display unit and the processing unit.

The display unit may comprise a base shaped to engage a headgear. The base may comprise at least one feature shaped to abut a brim of the headgear. The base may comprise an upper tab and a lower tab defining a groove therebetween, the groove being shaped to accommodate a brim of the headgear. The augmented reality display device may further comprise a moveable assembly coupled to the base, the moveable assembly having the display screen connected thereto. The moveable assembly may further have at least one of the image projector and thermal camera connected thereto. The moveable assembly may comprise a linkage arm assembly. The moveable assembly may comprise a four-bar linkage.

The strap may be an adjustable strap having an adjustable length. The adjustable strap may comprise at least one buckle configured to engage teeth. The adjustable strap may comprise a first strap portion connected to the display unit, and a second strap portion connected to the processing unit.

The augmented reality display device may further comprise a digital gyroscope outputting a signal to the processing structure, the processing structure processing the signal and providing a compass heading indicator in the processed image frames.

In one embodiment, there is provided an augmented reality display apparatus, comprising: the augmented reality display device described above; and headgear comprising a brim, the display unit being shaped to engage the brim.

In another aspect, there is provided an augmented reality display device, comprising: at least one mounting feature for engaging a headgear; a thermal camera configured to capture image frames; processing structure in communication with the thermal camera and the image projector, the processing structure being configured to process the captured image frames and output processed image frames; a battery; an image projector configured to display the processed image frames; and a display screen, the display screen being translatably moveable relative to the at least one feature for engaging the headgear.

The augmented reality display device may further comprise: a base shaped to engage the headgear; and a moveable assembly connected to the base, the moveable assembly having the display screen connected thereto. The moveable assembly may comprise a linkage arm assembly.

The thermal camera, the at least one mounting feature for engaging the headgear, the image projector and the display screen, may be accommodated within a display module, the processing structure and the battery may be accommodated within a processing unit, and the augmented reality display device may further comprise: a strap connecting the display unit and the processing unit. The strap may be an adjustable strap having an adjustable length. The adjustable strap may comprise at least one buckle configured to engage teeth. The adjustable strap may comprise a first strap portion connected to the display unit, and a second strap portion connected to the processing unit.

The augmented reality display device may further comprise a digital gyroscope outputting a signal to the processing structure, the processing structure processing the signal and providing a compass heading indicator in the processed image frames.

In still another aspect, there is provided an augmented reality display apparatus, comprising: a headgear having a brim; and an augmented reality display device having at least one mounting feature engaging the brim, the augmented reality display device comprising: a thermal camera configured to capture image frames, an image projector, a display screen, processing structure in communication with the thermal camera and the image projector, the processing structure being configured to process the captured image frames and output processed image frames to the image projector, and a battery, the display screen being moveable relative to the at least one mounting feature engaging the brim.

BRIEF DESCRIPTION OF THE DRAWINGS

Embodiments will now be described more fully with reference to the accompanying drawings in which.

DETAILED DESCRIPTION OF THE EMBODIMENTS

The foregoing summary, as well as the following detailed description of certain examples will be better understood when read in conjunction with the appended drawings. As used herein, an element or feature introduced in the singular and preceded by the word "a" or "an" should be understood as not necessarily excluding the plural of the elements or features. Further, references to "one example" or "one embodiment" are not intended to be interpreted as excluding the existence of additional examples or embodiments that also incorporate the described elements or features. Moreover, unless explicitly stated to the contrary, examples or embodiments "comprising" or "having" or "including" an element or feature or a plurality of elements or features having a particular property may include additional elements or features not having that property. Also, it will be appreciated that the terms "comprises", "has", "includes" means "including by not limited to" and the terms "comprising", "having" and "including" have equivalent meanings.

As used herein, the term "and/or" can include any and all combinations of one or more of the associated listed elements or features.

It will be understood that when an element or feature is referred to as being "on", "attached" to, "connected" to, "coupled" with, "contacting", etc. another element or feature, that element or feature can be directly on, attached to, connected to, coupled with or contacting the other element or feature or intervening elements may also be present. In contrast, when an element or feature is referred to as being, for example, "directly on", "directly attached" to, "directly connected" to, "directly coupled" with or "directly contacting" another element of feature, there are no intervening elements or features present.

It will be understood that spatially relative terms, such as "under", "below", "lower", "over", "above", "upper", "front", "back" and the like, may be used herein for ease of description to describe the relationship of an element or feature to another element or feature as illustrated in the figures. The spatially relative terms can however, encompass different orientations in use or operation in addition to the orientation depicted in the figures.

Figure 1:
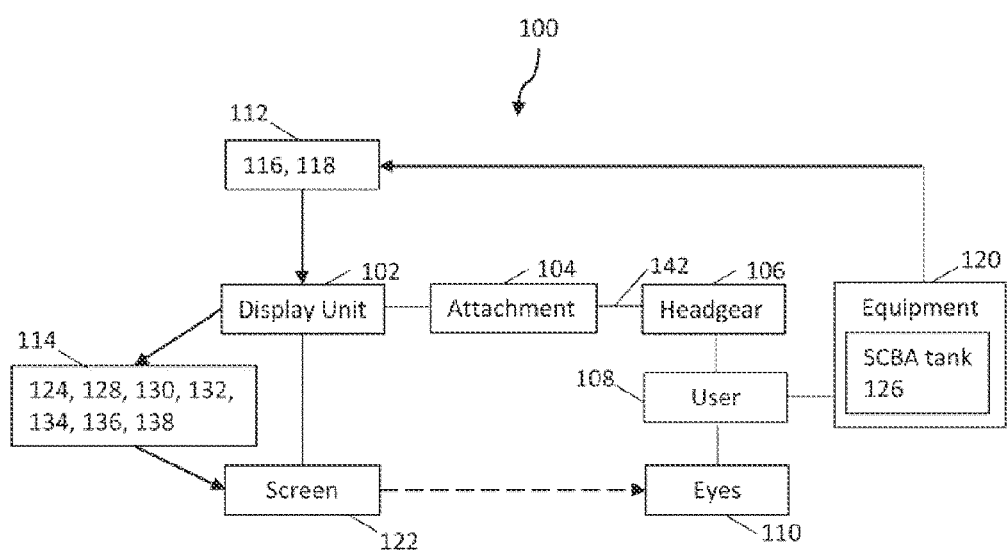
FIG. 1 is a schematic block diagram of an augmented reality display system.

Referring to FIG. 1, illustrated therein is a block diagram of an augmented reality (AR) display system 100, in accordance with an embodiment. The display system 100 includes headgear 106 worn by a user 108. The headgear 106 includes functional or protective headgear normally worn by the user 108 in the performance of the user's duties. For example, the headgear 106 may be a cap or a helmet worn by first responders such as police, paramedics, and firefighters. The headgear 106 may be a protective helmet for construction, mining or other jobs requiring head protection. In accordance with an embodiment, the headgear 106 includes a Self-Contained Breathing Apparatus (SCBA) mask worn by the user 108.

The display system 100 includes a display unit 102. The display unit 102 receives a data input 112. The data input 112 includes a view of the environment 116 to be augmented. The data input 112 may include data 118 relating to equipment 120 carried by the user 108 that is interfaced with the display unit 102. For example, if the user 108 is a firefighter who is carrying a Self-Contained Breathing Apparatus (SCBA) tank 126, the display unit 102 may be interfaced with the SCBA tank 126.

The display unit 102 generates an augmented reality (AR) view of the environment 114 based on the data input 112. The AR view 114 aids the user 108 in the performance of the user's duties. For example, if the user 108 is a firefighter working in a burning building, the AR view 114 may include objects in the environment 124 that are hidden by smoke and cannot be seen directly by the user's eyes 110. If the firefighter is carrying a SCBA tank 126 that is interfaced with the display unit 102, the AR view 114 may include the oxygen level 134 in the SCBA tank 126. The AR view 114 may also include a date 128, a time 130, a compass 136, and a battery level 132 for the display system 100 and/or user equipment 120. The AR view 114, may include further information 138 that is relevant to the work the user 108 is engaged in.

The display system 100 includes a display screen 122 connected to the display unit 102. The display screen 122 shows the user 108 the AR view 114 generated by the display unit 102.

The display system 100 includes an attachment 104 for attaching the display unit 102 to the headgear 106. The attachment 104 attaches the display unit 102 to an exposed surface 142 of the headgear 106. The exposed surface 142 is not covered by the user 108 when the user 108 is wearing the headgear 106. For example, the exposed surface 142 may be a brim extending outward from the portion of the headgear 106 contacting the user 108. The attachment 104 to the exposed surface 142 allows for the display system 100 to be used as an add-on without modifying the headgear 106 to accept the display system 100.

Figure 2:
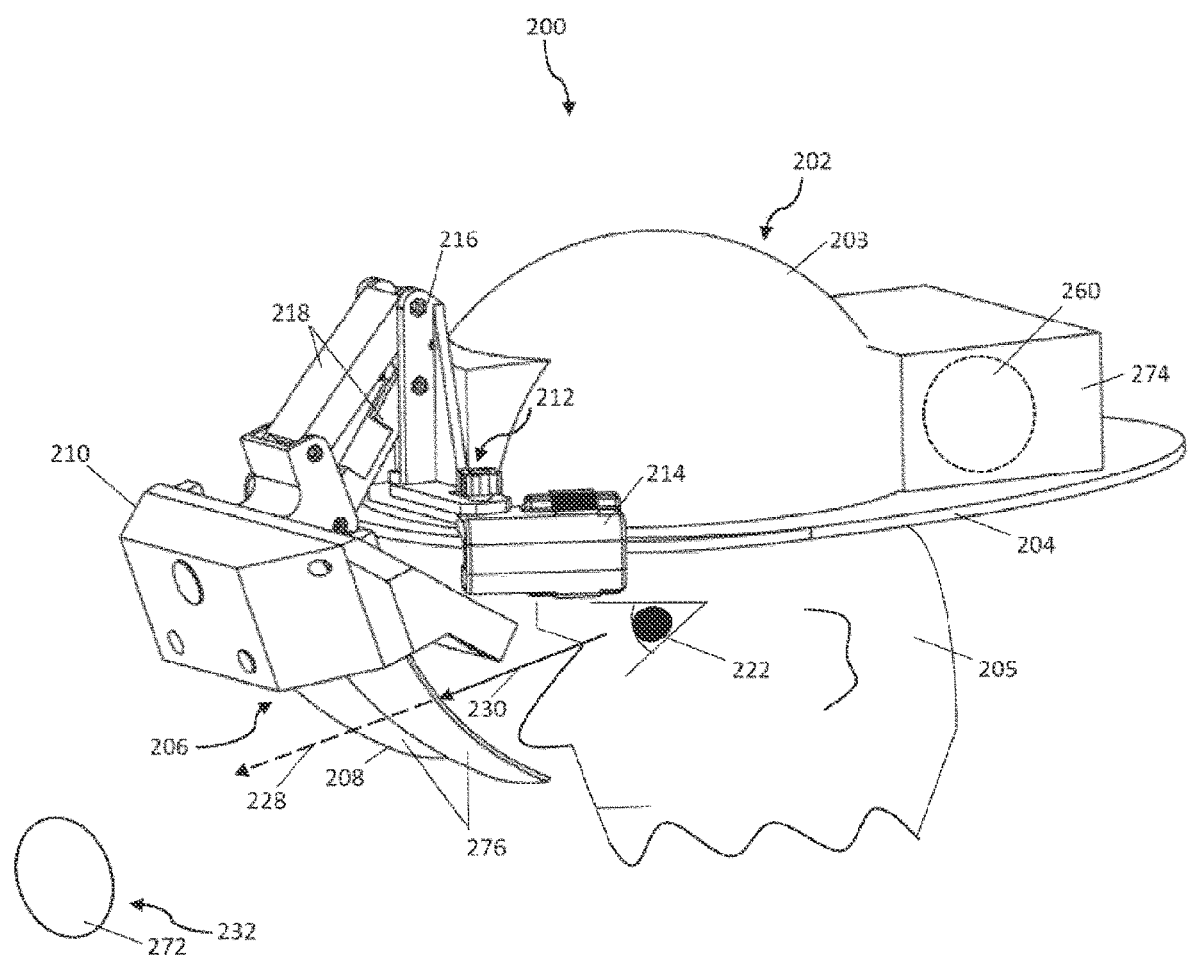
FIG. 2 is a perspective view of the augmented reality display system of FIG. 1, shown in use and worn by a user.
Figure 3:
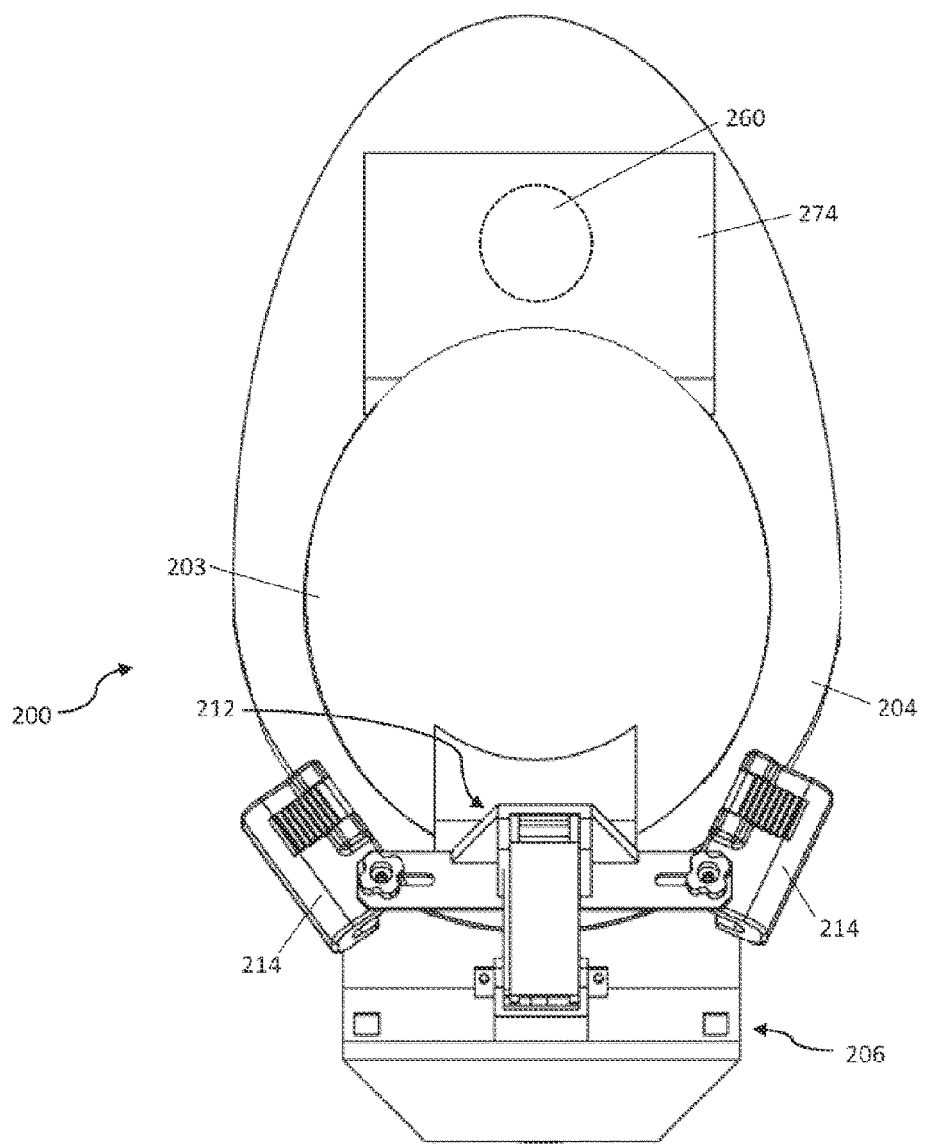
FIG. 3 is a top view of the augmented reality display system of FIG. 1.

Referring to FIGS. 2 and 3, illustrated therein is an AR display system 200, in accordance with an embodiment. The display system 200 includes headgear 202 worn by a user 205. The headgear 202 is a firefighter helmet 203. The helmet 203 includes a brim 204 projecting outward from the portion of the helmet 203 that is in contact with the user 205.

The display system 200 includes an AR display 206. The AR display 206 includes a spherical display screen 208. The display screen 208 shows the user 205 an AR view (such as AR view 114 of FIG. 1) of the user's environment 232.

Compared to other display systems which provide a relatively small display screen, the present system 200 includes a display screen 208 that is large. The display screen 208 has dimensions that substantially covers the user's entire field of view. This allows for the user 205 viewing the AR view on the display screen 208 to have a degree of depth perception equal to the user's depth perception when viewing the environment directly. For example, an object 272 in the environment 232, when viewed on the display screen 208, will appear similar in size and position as the when the object 272 is seen by the user 205 directly. This allows the user 208 to easily navigate the environment 232 while looking at the screen 208.

A further advantage of the large display screen 208 is that it allows for a large viewing area 276 on the screen 208. This allows the user 205 to see small objects and fine details on the screen 208 with less eye strain than if the display screen 208 and viewing area 276 was smaller. A large viewing area 276 also allows for more information (such as 124, 128, 130, 132, 134, 136, 128 in FIG. 1) to be displayed simultaneously on the screen 208, so that the user 205 is able to clearly distinguish and selectively focus on each to aid the user 205 in the performance of the user's duties.

Now referring to FIG. 2, the display screen 208 is positioned in front of the user's eyes 222, when the display system 200 is attached to the helmet 203. Thus, the display system 200 provides the user 205 with the flexibility to use both hands (not shown) freely while viewing the display screen 208 without having to hold any part of the display system 200.

The display screen 208 may be transparent. A transparent display screen 208 allows the user 205 to selectively focus on the display screen 208 or the environment 232. The user 205 may look through the display screen 208 to focus on the environment 232 directly as shown by arrow 228. Alternatively, the user 208 may focus on the display screen 208 as shown by arrow 230. The ability to selectively focus on the display screen 208 or the environment 232 allows the user 205 to perceive depth. Further, the user 205 may compare the augmented reality view on the display screen 208 to the direct view of the environment 232 to aid the user 205 in the performance of duties.

The display system 200 includes a mounting assembly 212. The mounting assembly attaches the AR display 206 to the helmet 203.

The mounting assembly 212 includes at least one connector 214. The connector 214 removably clamps to the brim 204 of the helmet 203. The connector 214, maintains the position of the mounting assembly 212 (and attached AR display 206) relative to the helmet 203.

As shown in FIG. 3, the mounting assembly 212 may be attached to the brim 204 of the helmet 203 by two connectors 214. The two connectors 214 allow for the mounting assembly 212 to be better fixed on the helmet 203 than if a single connector 214 is used. Further, the use of two connectors 214 distributes the weight of the AR display 206 and mounting assembly 212 across two points on the brim 204.

Figure 4:
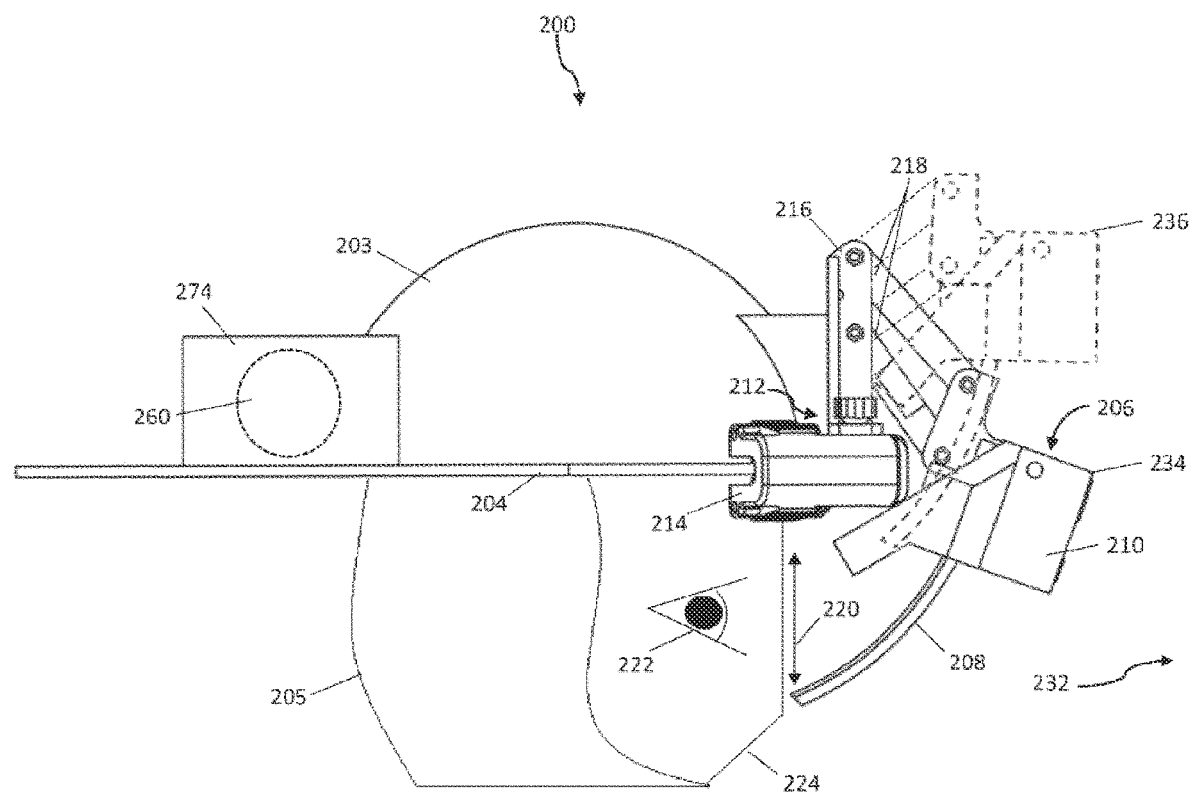
FIG. 4 is a side view of the augmented reality display system of FIG. 2, shown in use and worn by the user wearing a mask of a self-contained breathing apparatus (SCBA)

Referring to FIG. 4, illustrated therein is the augmented reality display system 200 of FIGS. 2 and 3, shown in relation to a user's eye 222 and a SCBA mask 224 worn by the user 205.

The display system 200 is independent of the SCBA mask 224, having all components of the system 200 outside the mask 224. This configuration offers an advantage over display systems for first responders wherein certain components are located inside the mask and other components are outside the mask with wiring running between. A limitation of these display systems is that components are incorporated into SCBA systems by OEM manufacturers and cannot be installed by the user 205.

The present display system 200, being independent of the mask 224, allows for easy installation by the user 205 and is widely compatibility as an add-on with a range of existing SCBA systems and headgear. A further advantage of the display system 200 being independent of the mask 224 is the ability for the user 205 to move the display screen 208 for an unobstructed view of the environment without first removing the headgear 202 and mask 224, thereby reducing the user's exposure to environmental hazards in a rescue situation.

Referring to FIGS. 2 and 4, the mounting assembly 212 includes a display mount 216 attached to the connector 214. The display mount 216 is attached to the AR display 206. The display unit 210 of the AR display 206 is pivotally connected to the display mount 216 of the mounting assembly 212 via a pair of parallel arms 218. The pair of parallel arms 218 allow the AR display 206 to translate vertically with respect to the display mount 216. The position of the display screen 208 is fixed relative to the display unit 210. A vertical translation of the display unit 210 is accompanied by a corresponding vertical translation of the display screen 208.

Now referring to FIG. 4, illustrated therein is the vertical translation 220 of the AR display 206 relative to the display mount 216. The vertical translation 220 is between a first position (solid lines) 234 and a second position (dashed lines) 236. In the first position 234, the display screen 208 is positioned in front of the user's eyes 222. In the second position 236, the display screen 208 is translated upward, out of the user's sightline.

The ability to move the display screen 208 allows the user 205 to choose between seeing an AR view (such as AR view 114 of FIG. 1) of the environment 232 when the screen 208 is in the first position 234, and an unobstructed direct view of the environment 232 when the screen 208 is in the second position 236.

The display system 200, may further include a locking mechanism (not shown) to allow the user 205 to lock the AR display 206 in the first position 234 or the second position 236.

Referring again to FIG. 2, the display system 200 includes a display unit 210. The display unit contains components for capturing a thermal view of the user's environment, rendering an augmented reality view of the environment 232 and outputting the augmented reality view to the display screen 208.

Figure 5:
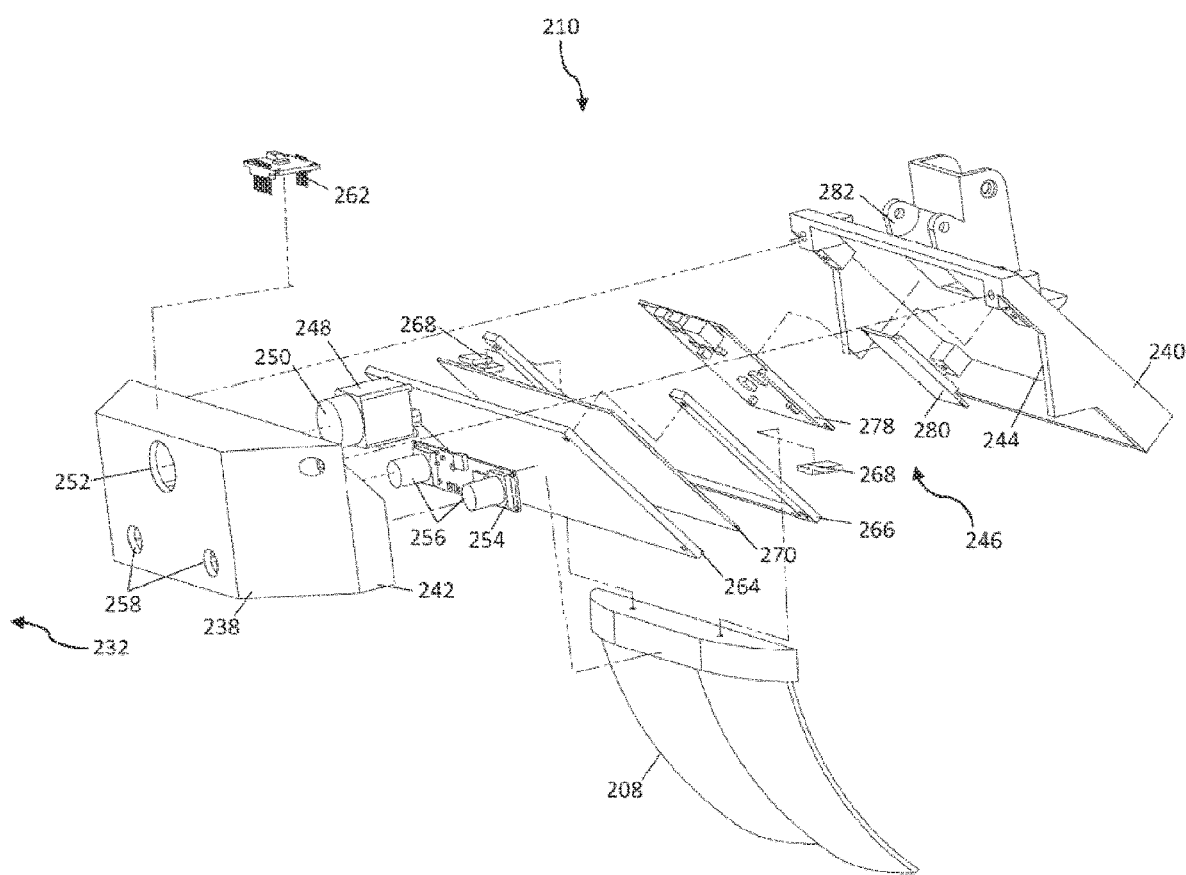
FIG. 5 is an exploded perspective view of a display unit forming part of the augmented reality display system of FIG. 1.

Referring to FIG. 5, illustrated therein are the components of the display unit 210. The display unit includes a front shell 238 and a back shell 240. The front shell 238 and back shell 240 are opposable with respect to one another. The front shell includes at least one projection 242. The back shell includes at least one indent 244. The front shell 238 and the back shell 240 are complimentary such that the projection 242 fits into the indent 244 where the front shell 238 contacts the back shell 240. Together, the front shell 238 and back shell 240 enclose a space 246. The space 246 enclosed by the front shell 238 and back shell 240 contains the internal components of the display unit 210.

The display unit 210 includes a thermal imaging camera 248. The thermal camera 248 is preferably a FLIR Boson or similar thermal imaging camera, having small size, light weight and low energy consumption suitable for integration into portable battery powered equipment. Preferably the thermal camera 248 has at least 8× continuous zoom to allow for dynamic focusing. The thermal camera 248 should be capable of image capture at a frame rate of 60 Hz. The thermal camera 248 is positioned adjacent to an aperture 252 in the front shell 238. The camera 248 includes a lens 250. The lens 250 is pointed through the aperture 252 to view the environment 232. The camera 248 (and lens 250) should be positioned proximate to the user's eyes to capture the user's field of view. Ideally, the camera 248 should be positioned between the user's eyes so that the camera's field of view tracks the direction in which the user is looking.

The display unit 210 includes a dual camera 254. The dual camera 254 includes two optical sensors 256. The dual camera 254 is positioned adjacent to apertures 258 in the front shell 238 such that the optical sensors 256 are pointed through the apertures 258 to view the environment 232. The use of two optical sensors 256 allows for depth perception when the dual camera 254 is scanned across a room. The dual camera 254 combines the view of the environment 232 captured by each optical sensor 256 into a single image. The output from the dual camera 254 can be wirelessly transmitted to a remote location, such as a command center, where fire rescue is coordinated. The output that is transmitted may also be recorded to a media storage device for later viewing. In this way, the recorded output can be reviewed for analysis of firefighter skill and execution and for training purposes.

The display unit 210 includes a gyroscope 262. The gyroscope 262 allows for a compass (such as compass 136 of FIG. 1) to be displayed on the display screen 208. The compass provides the user with orientation information in situations where poor visibility can cause disorientation.

The display unit 210 may include a GPS transceiver 280. The GPS transceiver 280 allows for location tracking of a user (such as user 205 in FIGS. 2 and 4) by transmitting the user's location data, including GPS coordinates, which is received at a remote location, such as a command center where rescue efforts are coordinated. The transmitted location data may be used to determine the position of the user relative to the position of colleagues that are also broadcasting location data. The relative positions of the user and colleagues received at a command center may be used to coordinate rescue efforts. The GPS transceiver 280 is also able to receive the location data of colleagues in the vicinity. The GPS transceiver 280 allows the display screen 208 to show the relative position of colleagues that are in the vicinity of the user.

The display unit 210, includes components 278 for wireless network connectivity, so that the AR view (such as 114 of FIG. 1) displayed on the screen 208 and/or the view of the environment 232 captured by the dual camera 254 can be wirelessly transmitted to a remote location, such as a command center, where fire rescue is coordinated. The transmitted view may also be recorded to a media storage device for later viewing. In this way, the recording can be reviewed for analysis of firefighter skill and execution and for training purposes.

In the embodiment shown in FIG. 5, the GPS transceiver 280 and wireless network components 278 are located within the display unit 210. According to another embodiment, the GPS transceiver 280 and wireless network components 278 may be located within a processing unit (such as processing unit 274 in FIGS. 2, 3 and 4).

The display unit 210 includes a first screen shield 264 and a second screen shield 266. The screen shields 264, 266 maintain the position and spacing of components within the display unit 210. The display unit 210 includes two screen fixers 268. The screen fixers 268 attach the display screen 208 to the second screen shield 266.

The display unit 210 includes a projection screen 270. The projection screen projects the AR view (such as 114 of FIG. 1) rendered by the display unit 210 onto the display screen 208. The AR view projected by the projection screen 270 is inverted, so that the reflection on the display screen 208 as seen by the user is oriented correctly.

The display unit 210 includes an attachment mount 282 for attaching additional accessories (not shown). Additional accessories may include an identification badge or crest normally placed on the front of the headgear 203.

Referring again to FIGS. 2, 3 and 4, the display system 200 includes a processing unit 274 attached to the helmet 203. The attachment of the processing unit 274 to the helmet 203 can be done by adhesive for a permanent attachment or attachment by Velcro or tensile straps for a removable attachment. The processing unit 274 is in connection with the display unit 210 of the AR display 206. The processing unit 274 contains a rechargeable battery pack (not shown) for powering the display system 200. The processing unit 274 is positioned on the helmet brim 204 opposite the AR display 206. This configuration allows the processing unit 274 to counterbalance the weight of the AR display 206 and mounting assembly 212 so that the helmet 203 remains stably positioned on the user's head when the display system 200 is attached to the helmet 203.

The processing unit 274 includes an image processing system 260. The image processing system 260 is coupled to components within the display unit 210 (including thermal camera 248, dual camera 254, projection screen 270, GPS transceiver 280 and wireless network components 278 of FIG. 5). The processing system 260 receives the view of the environment 232 captured by a thermal camera (such as thermal camera 248 of FIG. 5), renders an AR view (such as AR view 114 of FIG. 1) of the environment 232 and outputs the AR view to a display screen (such as display screen 208 in FIGS. 2, 4 and 5).

Figure 6:
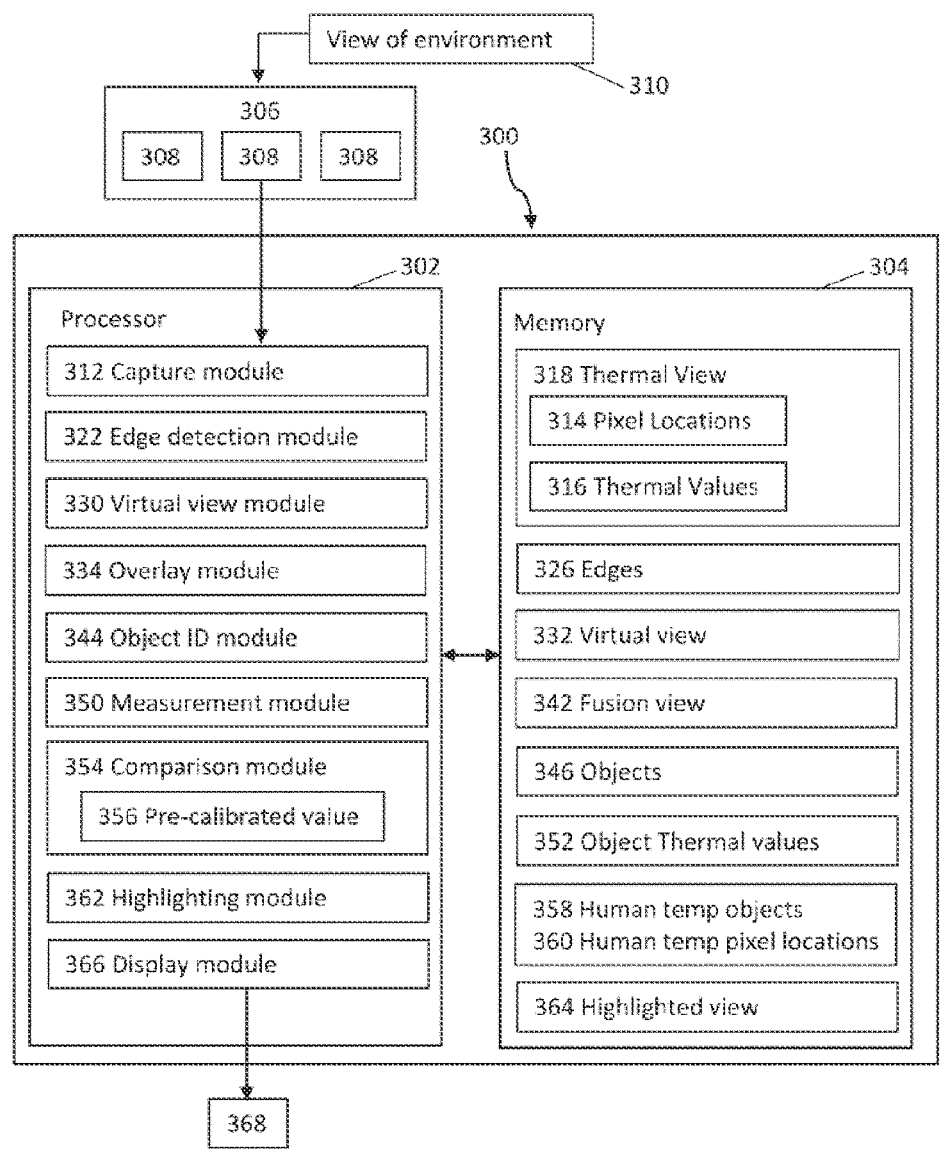
FIG. 6 is a schematic block diagram of an image processing system forming part of the augmented reality display system of FIG. 1.

Referring to FIG. 6, illustrated therein is a diagram of an image processing system 300, in accordance with an embodiment. The processing system 300 may be the image processing system 260 contained within the processing unit 274 of FIGS. 2, 3 and 4. The processing system 300 includes a processor 302 having a plurality of modules.

The processing system 300 also includes a memory 304 having a plurality of memory units. The processor 302 is in communication with the memory 304.

The processing system 300 is connected to a thermal imaging camera 306, such as thermal camera 248 of FIG. 5. The camera 306 captures a view of the environment 310. The camera 306 captures the view 310 as a plurality of frames 308. Each frame 308 captured by the camera 306 is sent to the processor 302. Each frame 308 received by the processor 302 begins an iteration of the processing system 300.

The processor 302 includes a capture module 312. The capture module 312 receives each frame 308 from the camera 306. For each frame 308, the capture module 312 obtains a thermal value 316 for each pixel location 314 in the frame 308. The pixel location 314 and corresponding thermal value 316 obtained by the capture module 312 are sent to the memory 304. The memory 304 stores the pixel locations 314 and thermal values 316 together as a "thermal view" 318 of the frame 308. The thermal view 318 includes the thermal value 316 for each pixel location 314 in the frame 308. The thermal view 318 is retained in the memory 304, until the system 300 completes an iteration and the next frame 308 is received by the capture module 312.

The processor 302 includes an edge detection module 322. The edge detection module 322 retrieves the thermal view 318 from the memory 304. The edge detection module 322 locates edges 326 in the thermal view 318. The edges 326 are indicative of objects (such as object 272 of FIG. 2) in the view of the environment 310 captured in the frame 308. The edges 326 found by the edge detection module 322 are sent to the memory 304. The edges 326 are retained in the memory 304 until the system 300 completes the iteration and the next frame 308 is received by the capture module 312.

The processor 302 includes a virtual view module 330. The virtual view module 330 retrieves the edges 326 from the memory 304. The virtual view module 330 renders a "virtual view" 332 of the frame 308. The virtual view 332 includes only the edges 326. Pixel locations 314 not deemed to be edges 326 by the edge detection module 322 are omitted from the virtual view 332. The virtual view 332 rendered by the virtual view module 330 is sent to the memory 304. The virtual view 332 is retained in the memory 304 until the system 300 completes the iteration and the next frame 308 is received by the capture module 312.

The processor 302 includes an overlay module 334. The overlay module 334 retrieves the thermal view 318 and the edges 326 from the memory 304. The overlay module 334 overlays the edges 326 onto the thermal view 318 to render a "fusion view" 342 of the frame 308. The fusion view 342 includes the edges 326, the pixel locations 314 and thermal values 316 (taken from the thermal view 318). The fusion view 342 rendered by the overlay module 334 is sent to the memory 304. The memory 304 retains the fusion view 342 until the system 300 completes the iteration and the next frame 308 is received by the capture module 312.

The processor 302 includes an object identification module 344. The object identification module 344 retrieves the fusion view 342 from the memory 304. The object identification module 344 identifies objects 346 in the fusion view 342. The objects 346 are pixel locations 314 in the fusion view 342 that are wholly enclosed by edges 326. Wholly enclosed means pixel locations 314 that are surrounded by an unbroken ring of edges 326. A plurality of adjacent pixel locations 314 may be wholly enclosed by edges 326. The objects 346 identified by the object identification module 344 are sent to the memory 304. The memory 304 retains the objects 346 until the system 300 completes the iteration and the next frame 308 is received by the capture module 312.

The processor 302 includes a measurement module 350. The measurement module 350 retrieves the thermal view 318 and objects 346 from the memory 304. The measurement module 350 obtains the thermal value 316 (taken from the thermal view 318) for each object 346. For a plurality of adjacent pixel locations 314 corresponding to an object 346, the measurement module 350 calculates an object thermal value 352. The object thermal value 352 is the average of the thermal values 316 for the pixel locations 314 corresponding to the object 346. The object thermal values 352 calculated by the measurement module 350 are sent to the memory 304. The memory 304 retains the object thermal values 352 until the system 300 completes the iteration and the next frame 308 is received by the capture module 312.

The processor 302 includes a comparison module 354. The comparison module 354 is programmed with a pre-calibrated thermal value 356 for human body temperature. The comparison module 354 retrieves the objects 346 object thermal values 352 and pixel locations 314 from the memory 304. The comparison module 354 compares the object thermal value 352 of each object 346 against the pre-calibrated value 356. If the object thermal value 352 for the object 346 accords with the pre-calibrated value 356, the object 346 is deemed to have human temperature. The objects 356 deemed as having human temperature, along with the corresponding object pixel locations 314 are sent to the memory 304. The memory stores the objects 346 as human temperature objects 358 and the corresponding pixel locations 314 as human temp pixel locations 360. The memory 304 retains the human temperature objects 358 and the human temperature pixel locations 360 until the system 300 completes the iteration and the next frame 308 is received by the capture module 312.

The processor 302 includes a highlighting module 362. The highlighting module 362 retrieves the thermal values 316, the edges 326 and the human temperature pixel locations 360 from the memory 304. The highlighting module 362 renders a "highlighted view" 364 of the frame 308. The highlighted view 364 includes the edges 326 and the thermal values 316 for the human temperature pixel locations 360. The highlighted view 364 is sent to the memory 304. The memory 304 retains the highlighted view 364 until the system 300 completes the iteration and the next frame 308 is received by the capture module 312.

The processor 302 includes a display module 366. The display module 366 retrieves the highlighted view 364 from the memory 304. The display module 366 is coupled to a display screen 368. The display module 366 outputs the highlighted view 364 to the display screen 368. Once the highlighted view 364 is output to the display screen 368, the iteration of the processing system 300 is complete and the capture module 312 receives the next frame 308 from the camera 306. Optionally, the user can choose to output the thermal view 318 or the virtual view 332 to the display screen 368 in accordance with an embodiment. The display module 366 retrieves the thermal view 318 or virtual view 332 from the memory 304 for output to the display screen 368.

The time taken for a single iteration of the system 300 should be less than the inverse of the frame rate of the thermal imaging camera 306. For example, if the camera 306 captures the view of the environment 310 at 30 frames per second, a single iteration of the processing system 300 should not exceed 1/30 seconds. This allows for the processing system 300 to receive each frame 308 and output the highlighted view 364 in real time.

Disclosed herein is a mounting assembly for attaching a display screen to headgear. The mounting assembly can be used with a variety of headgear types and sizes. The mounting assembly allows for a display screen to be positioned in front of the user's eyes, and on the outside of a SCBA mask worn by the user.

Figure 7:
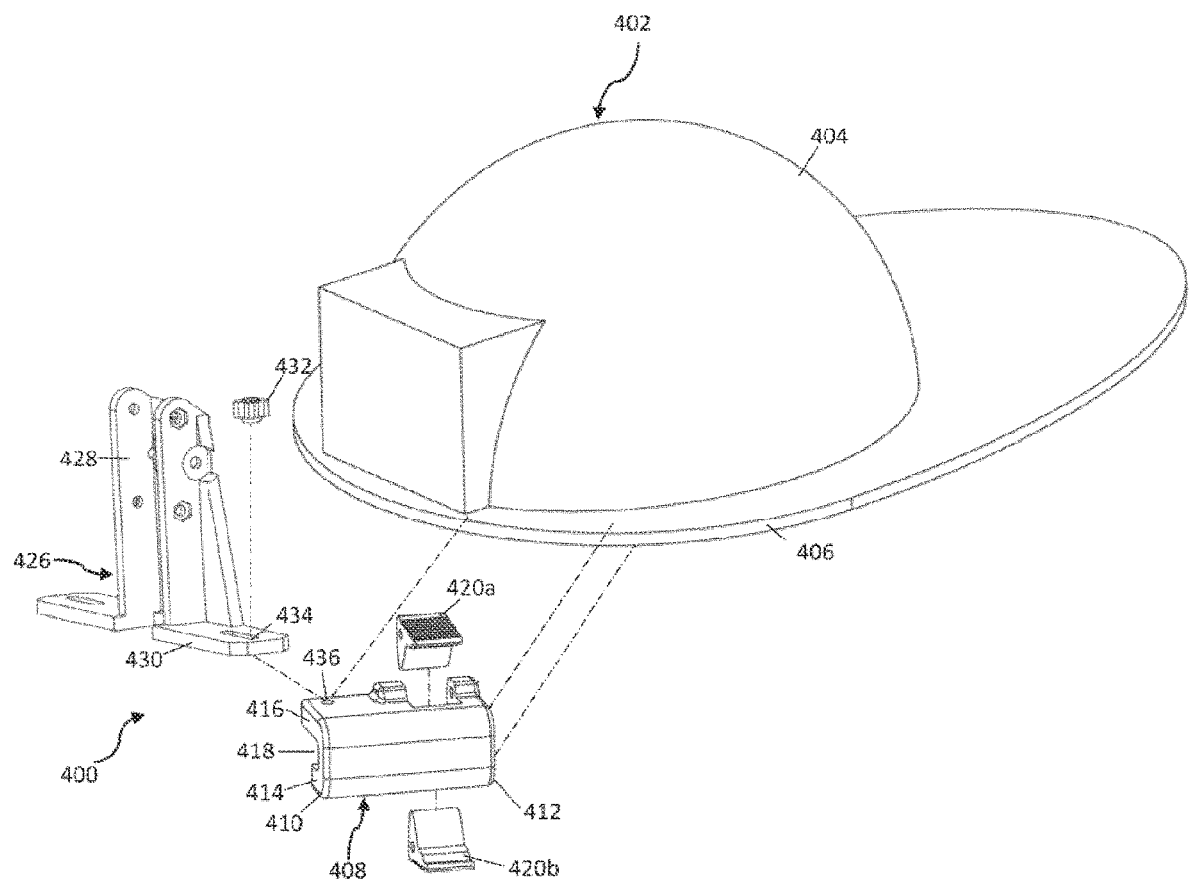
FIG. 7 is an exploded perspective view of a mounting assembly forming part of the augmented reality display system of FIG. 1, and a helmet being used therewith.

Referring to FIG. 7 illustrated therein are the components of a mounting assembly 400 shown attaching to headgear 402 in accordance with an embodiment. The headgear 402 is a firefighter helmet 404, and includes a brim 406.

The mounting assembly 400 includes at least one connector 408 for reversibly attaching the mounting assembly to the helmet brim 406. The connector 408 is U-shaped, having a proximate end 410, a distal end 412, and flanges 414, 416 that form a groove 418. For attachment, the groove 418 contacts the helmet brim 406 for attachment, so that the brim 406 is interposed between the flanges 414, 416 of the connector 408. Ideally, the helmet brim 406 should extend into the groove 418 up to the depth of the flanges 414, 416 to allow for even weight distribution of the assembly 400 across the helmet brim 406. The connector 408 includes two locking members 420a, 420b.

Figure 8:
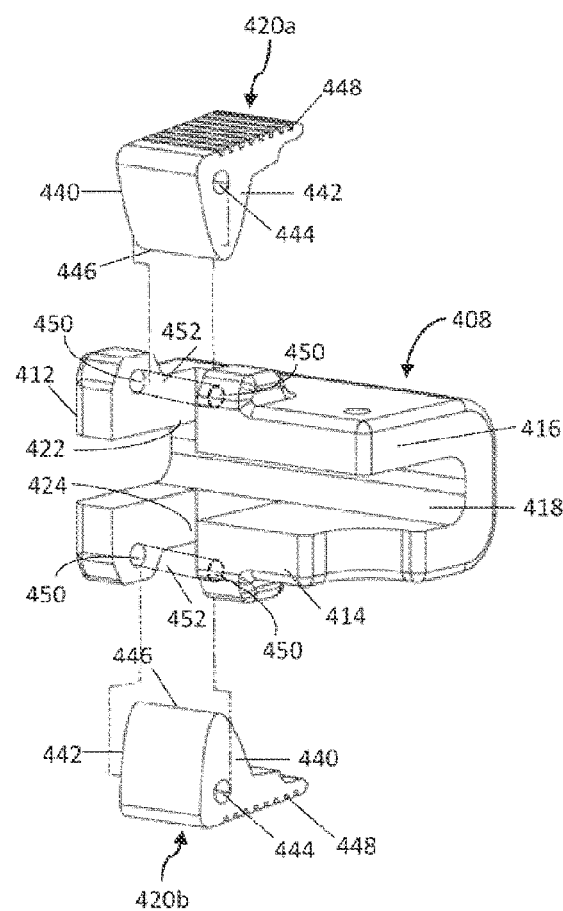
FIG. 8 is an exploded perspective view of a connector and locking members forming part of the mounting assembly of FIG. 7.

Referring to FIG. 8, illustrated therein is a close up view of the connector 408 and locking members 420a, 420b of FIG. 7. The connector 408 has a first recess 422 in the flange 416 for receiving locking member 420a. The connector 408 has a second recess 424 in the flange 414 for receiving locking member 420b. The recesses 422, 424 are adjacent to the distal end 412 of the connector 408. The locking members 420a, 420b each have opposable ends 440 and 442, an opening 444, a jaw 446 and a pivot arm 448. The opening 444 passes between the ends 440, 442 of each locking member 420a, 420b. Each locking member 420a, 420b is permanently attached to the connector 408 by a locking pin 452. Each locking pin 452 passes through the locking members 420a, 420b via the opening 444 and protrudes from both ends 440, 442. The recesses, 422, 424 each have two dimples 450 to receive the locking pin 452 protruding from each end 440, 442 of the locking members 420a, 420b.

Still referring to FIG. 8, the locking members 420a, 420b are pivotable about the locking pin 452. The locking members 420a, 420b pivot between two positions. In the first position (as shown), the pivot arm 448 is parallel to the flanges 414, 416, and the jaw 446 is perpendicular to the flanges 414, 416 and extends into the groove 418. The jaw 446, of each locking member 420a, 420b are opposable and act together to reversibly clamp the connector 408 to a helmet brim (such as brim 406 of FIG. 7). The brim is held between the jaw 446 of each locking member 420a, 420b within the groove 418. Attachment of the connector 408 to the helmet brim is maintained by the frictional force of the jaw 446 on the helmet brim. In the second position (not shown), the pivot arm 448 is perpendicular to the flanges 414, 416 and the jaw 446 is parallel to the flanges 414, 416 so that the jaw 446 does not contact the helmet brim allowing for detachment of the connecter 408 from the brim. The locking members 420a, 420b are transitioned between the first and second position by the user exerting force on the pivot arm 448. The use of clamping means for attaching the connector 408 to the brim allows for quick installation and removal of the connector (and the entire mounting assembly 400 of FIG. 7) by hand without the need for any specialized tools. It is also possible for the user to remove the mounting assembly 400 from the headgear 402, by hand, without first removing the headgear 402.

Referring again to FIG. 7, the connector 408 is attached to a display mount 426. The display mount 426 includes a support 428, positioned perpendicular to the helmet brim 406, for connecting the display mount 426 to a display screen (not shown). The display mount 426 includes a base 430, positioned parallel to the helmet brim 406, for attaching the display mount 426 to the connector 408. The base 430 is attached to the proximate end 410 of the connector 408 by a friction fastener 432 via an aperture 434 in the base 430. The fastener 432 passes through the aperture 434 in the base 430, and through an aperture 436 in the flange 416 of the connector 408. The friction fastener 432 and the aperture 436 may be threaded. Attachment of the display mount 426 to the connector 408 is maintained by frictional force of the fastener 432 on the base 430 of the display mount 426.

The fastener 432 can be driven by hand. This allows for the display mount 426 to be easily attached or removed from the connector 408 without the need for any specialized tools.

Figure 9:
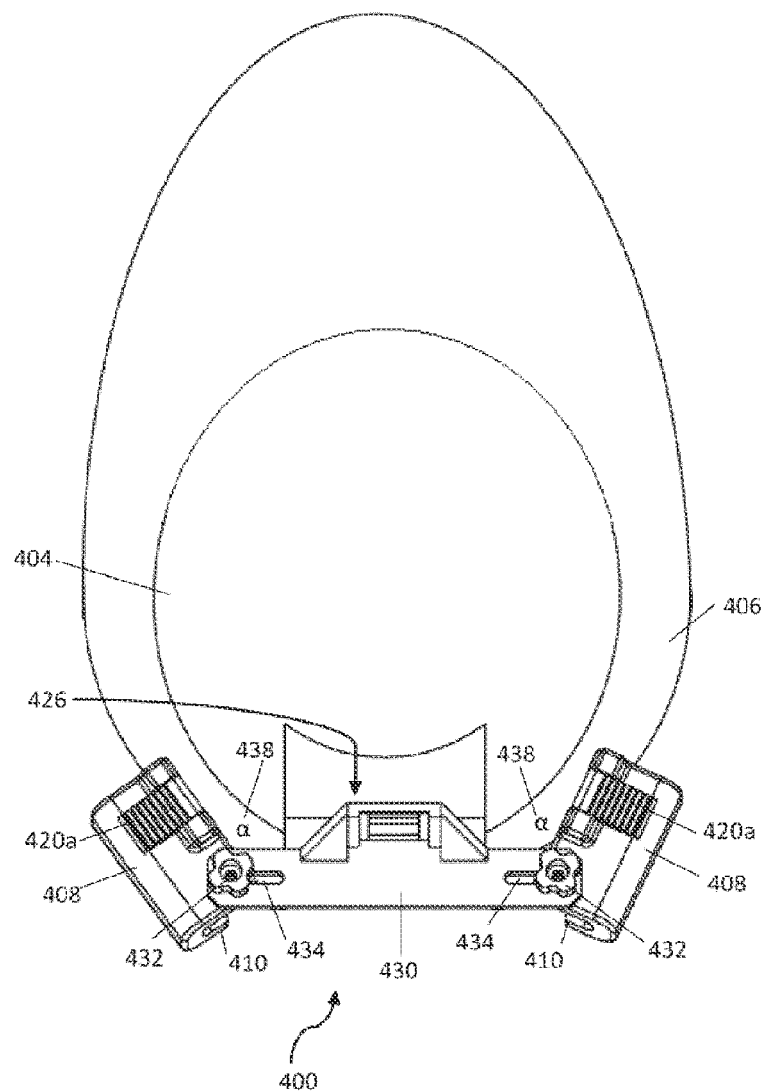
FIG. 9 is a top view of the mounting assembly of FIG. 7.

Referring to FIG. 9, illustrated therein is the mounting assembly 400 of FIG. 7, shown attached to a helmet 404. It is preferable to use at least two connectors 408 for attaching the mounting assembly 400 to the helmet 404. The use of two connectors 408 allows for the position of the mounting assembly 400 to be better fixed on the helmet 404. Further, the use of two connectors 408 allows for the weight of the mounting assembly 400 (and display screen when attached) to be more evenly distributed across the brim 406 of the helmet 404 than if a single connector is used.

The attachment angle 438 formed between the base 430 and the proximate end 410 of the connector 408 can be any obtuse angle, allowing for the mounting assembly 400 to be attached to helmet brims with varying size and curvature. Ideally, both angles 438 should be equal to allow for the weight of the mounting assembly 400 and display screen (not shown) when attached to be evenly distributed across the area of the brim 406 that is in contact with the connectors 408. The shape of the aperture 434 in the base 430 allow for the fastener 432 to attach the base 430 to the connector 408 at various points more proximate or distal to the center of the base 430, further increasing the compatibility of the mounting assembly 400 with different helmet types. A user can vary the attachment angels 438 and point of attachment between the connectors 108 and the base 430 of the display mount 412 to determine the optimal parameters for attachment to a given helmet type.

Figure 10:
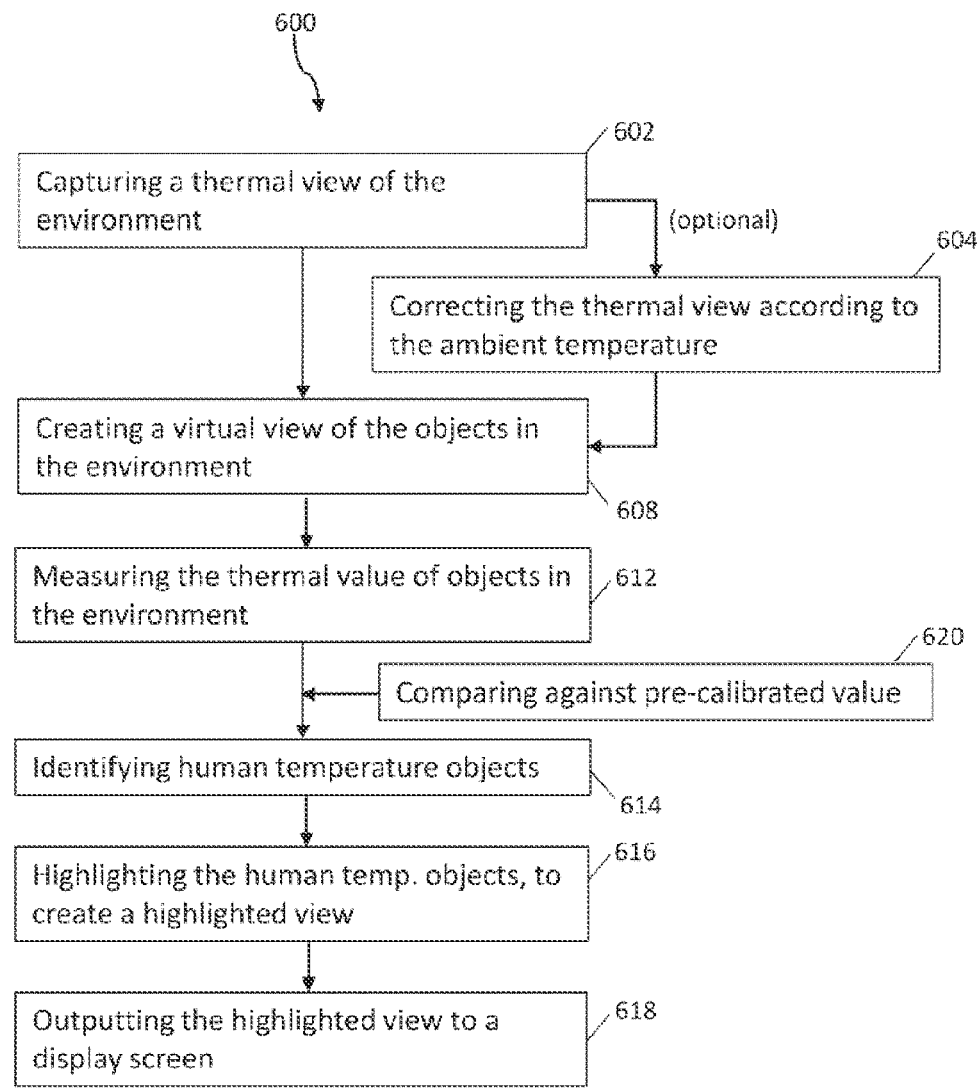
FIG. 10 is a flowchart of human temperature object identification method used by the augmented reality display system of FIG. 1.

Referring to FIG. 10, illustrated therein is a flow chart of a method 600, in accordance with an embodiment, for firefighters and first responders to locate and identify people in a burning building where low light, dust, smoke and debris can obscure the first responder's view of the surroundings. The method 600 includes thermal imaging and edge detection image processing to provide an augmented reality view of the user's environment by highlighting human temperature objects in the field of view, allowing for quick identification and location of persons obscured by poor visibility.

The method 600 includes capturing a thermal view of the environment to be augmented (602). 602 may be accomplished using the thermal imaging camera 248 of FIG. 5 or the thermal imaging camera 306 of FIG. 6.

Figure 11:
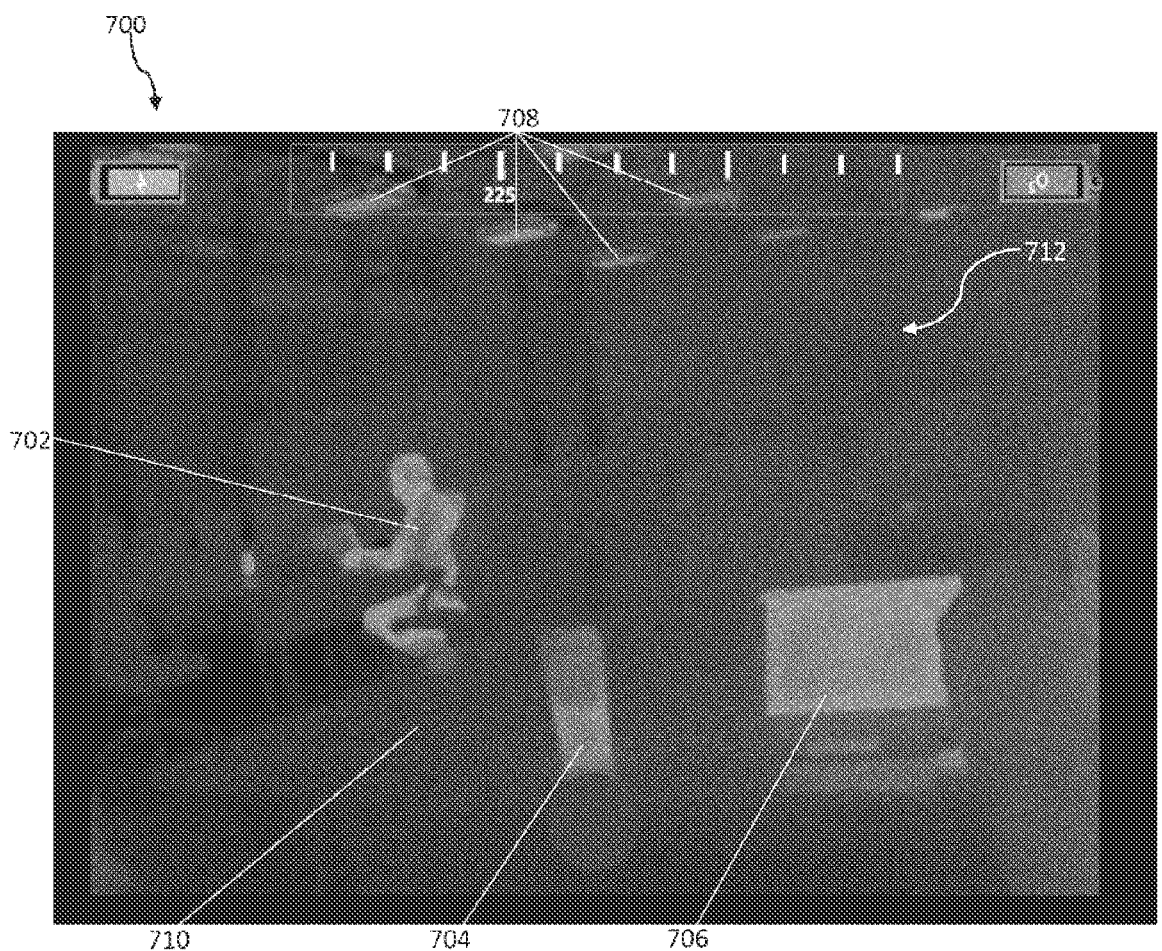
FIG. 11 is an example of a thermal view image of an environment captured by a thermal imaging camera.

Referring to FIG. 11, shown therein is an exemplary thermal view 700 of 602. The thermal view 700 corresponds to a single frame 308 in FIG. 6. The thermal view 700 consists of the pixel locations 314 and thermal values 316 making up the thermal view 318 of FIG. 6. The thermal view 700 shows the environment 712 according to thermal values (i.e. thermal values 316). Thermal values are represented in the thermal view 700 as brightness. Objects 702, 704, 706, 708 are at higher temperature, have a higher thermal value, and appear brighter. Object 710 is at a lower temperature, has a lower thermal value, and appears darker. The ambient temperature of the environment 712 is room temperature. Thus, the objects having a temperature higher than room temperature (a human 702, a computer 704, a monitor 706 and lights 708) appear brighter. The objects at (or below) room temperature (a desk 710) appear darker. A user viewing the thermal view 700 is able to distinguish warmer objects (the human 702, the computer 704, the monitor 706 and the lights 708) from cooler objects (the desk 710) based on the object's brightness in the thermal view 700.

In a burning building, the ambient temperature can rise, causing objects in the environment to increase in temperature. The increase in temperature causes the objects in the environment to have a higher thermal value and appear brighter in the thermal view than they would appear at room temperature. Consequently, a thermal view of a high temperature environment may become saturated, and individual objects in the thermal view may not be easily distinguishable by eye. To account for this, the method 600 may, optionally, comprise a thermal view that is corrected for the ambient temperature in the environment (604). 604 is achieved by uniformly reducing the thermal values (brightness) in the thermal view 700 by a factor corresponding to the ambient temperature in the environment. Alternatively, the correction of 604 may comprise increasing the contrast in the thermal view 700 so that warmer objects in the environment may be more easily distinguished from cooler objects.

The method 600 includes creating a virtual view of the objects in the environment according to the edges detected in the thermal view (608). 608 may be accomplished by concerted action of the edge detection module 322 and the virtual view module 330 of FIG. 6.

Figure 12:
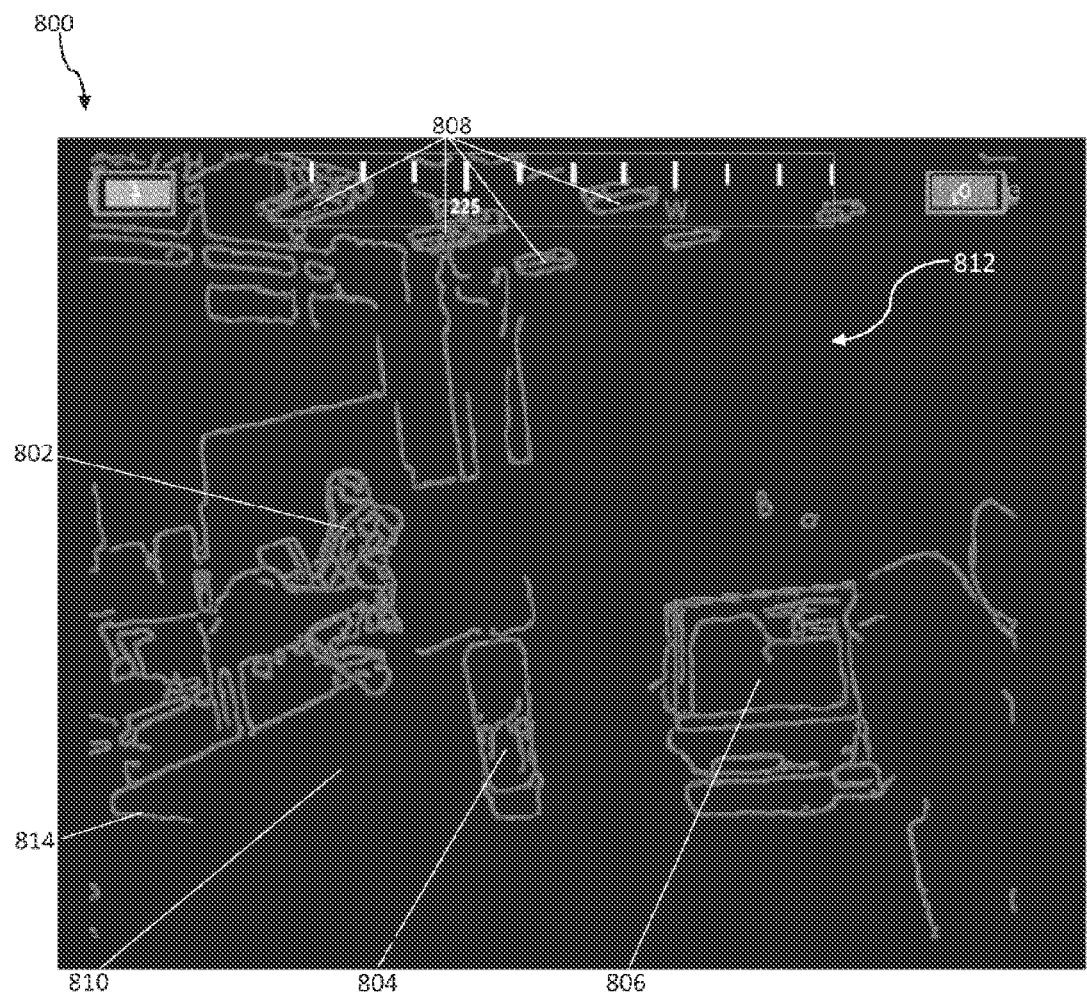
FIG. 12 is an example of a virtual view image, rendered by detecting edges of objects in the thermal view of FIG. 11.

Referring to FIG. 12, shown therein is an exemplary virtual view 800 of 608. The virtual view 800 corresponds to the virtual view 332 of FIG. 6. The virtual view 800 shows the delineated edges of objects 802, 804, 806, 808, 810 in the environment 812 that are captured in the thermal view 700. A user seeing the virtual view 800 is able to glean the presence of an object in the environment 812 by seeing its edge(s) in the virtual view 800. As such, the virtual view 800 of the environment can be used to identify objects or obstacles in the environment 812 based on the presence of its edge(s) in the virtual view 800.

The human 702, the computer 704, the monitor 706 and the lights 708, which have a higher thermal value and appear brighter in the thermal view 700, are delineated completely in the virtual view 800 as the human 802, the computer 804, the monitor 806 and the lights 808. The delineation of objects 802, 804, 806 and 808 is complete since the outline of objects 802, 804, 806 and 808 unbroken and the boundaries of 802, 804, 806 and 808 are clearly defined in the virtual view 800.

The desk 710, having a lower thermal value and appearing darker in the thermal view 700, is only partially delineated in the virtual view 800 as desk 810. The partially delineated desk 710 appears in the virtual view 800 as a "floating" edge 814. The floating edge 814 does not completely outline the boundary of the desk 810. A user seeing the virtual view 800 is nonetheless able to glean the presence of the desk 810 in the environment 812 by the existence of floating edge 814.

Referring again to FIG. 10, the method 600 includes measuring the thermal value of each completely delineated object (human 802, computer 804, monitor 806 and lights 808) in the virtual view 800 (612). 612 may be accomplished by concerted action of the object ID module 344 and measurement module 350 of FIG. 6.

Still referring to FIG. 10, the method 600 includes comparing the measured thermal value for each completely delineated object is against a pre-calibrated value for human body temperature (620). 620 may be accomplished by the comparison module 354 of FIG. 6. If the measured thermal value of the delineated object (ie. object thermal value 352 in FIG. 6) accords with the pre-calibrated value (ie. pre-calibrated value 356 in FIG. 6), the delineated object is identified a human temperature object (ie. human temp object 358 in FIG. 6) (614). According to another embodiment, 614 may be accomplished by using the pre-calibrated value of 620 as a threshold. Delineated objects with a thermal value equal to or exceeding the pre-calibrated value of 620 are identified as human temperature objects.

The method 600 includes highlighting the identified human temperature objects in the fusion view to create a highlighted view (616). 616 specifically highlights the human temperature objects in the environment, and excludes non-human temperature objects. 616 may be accomplished by the highlighting module 362 of FIG. 6.

Figure 13:
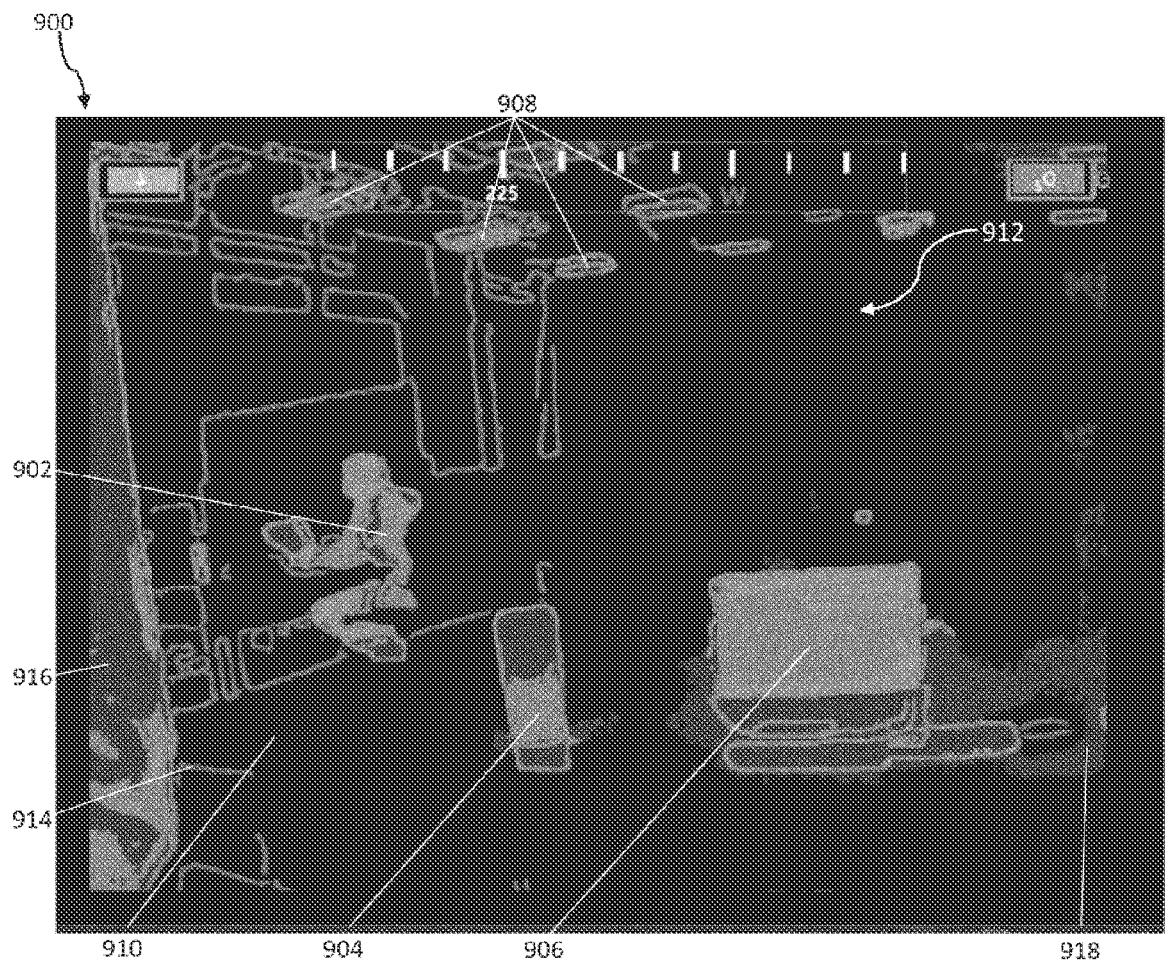
FIG. 13 is an example of an augmented reality view image, in which human temperature objects identified in the thermal view image of FIG. 11 are highlighted.
Figure 14A:
FIGS. 14A and 14B are examples of color and greyscale images generated using the human temperature object identification method of FIG. 10.
Figure 14B:
Figure 15:
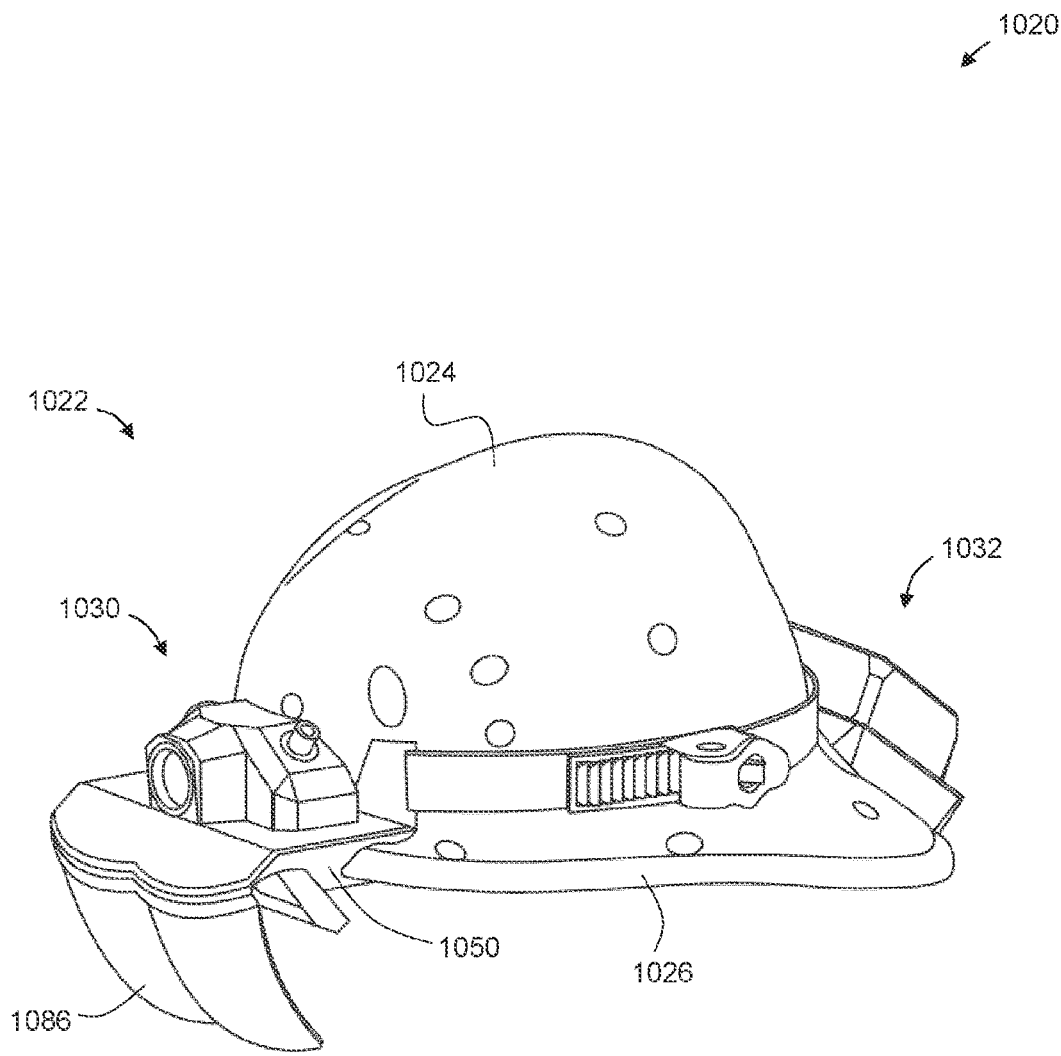
FIG. 15 is a perspective view of another embodiment of an augmented reality display apparatus.
Figure 16:
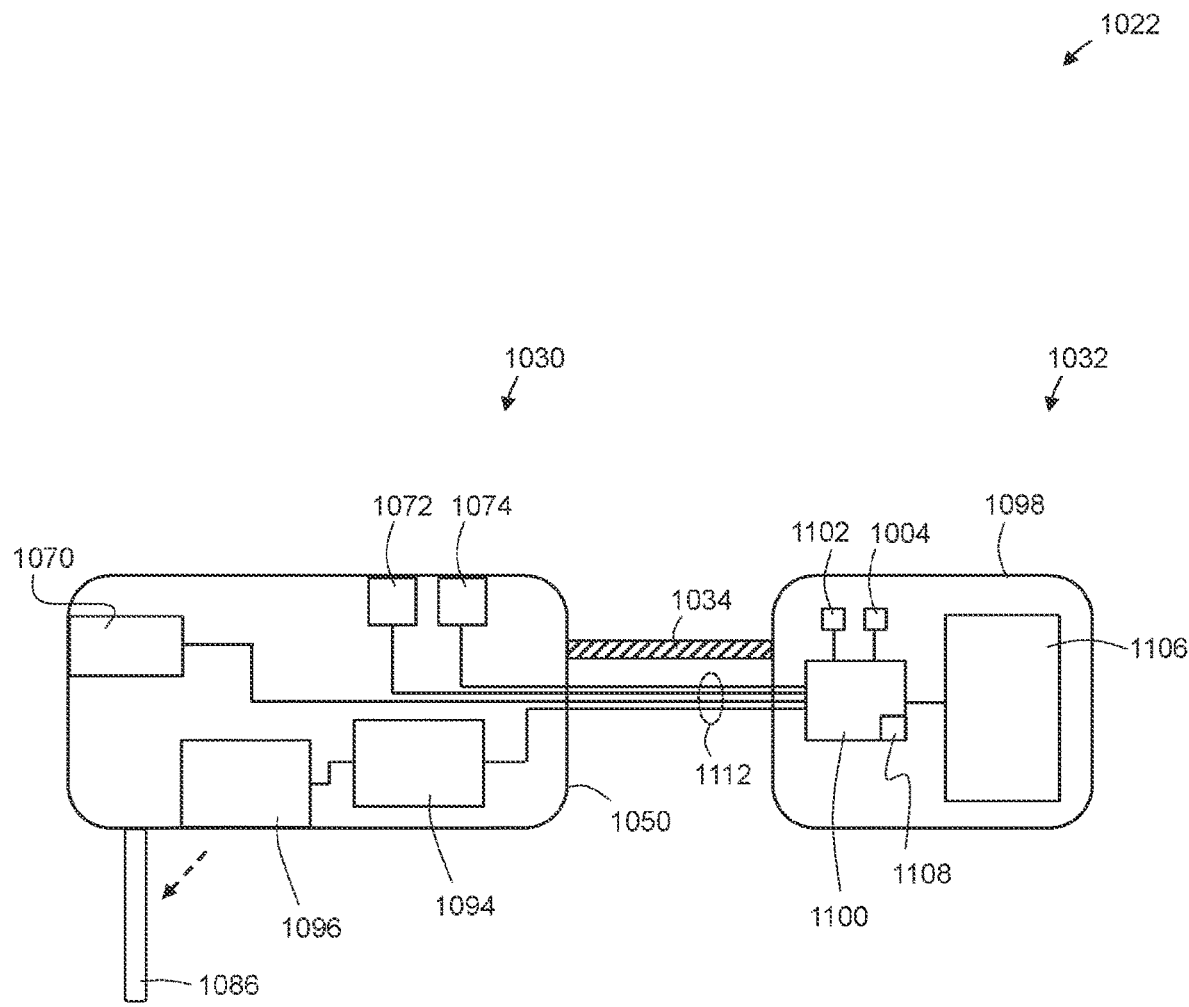
FIG. 16 is a schematic block diagram of an augmented reality display device forming part of the augmented reality display apparatus of FIG. 15.
Figure 17:
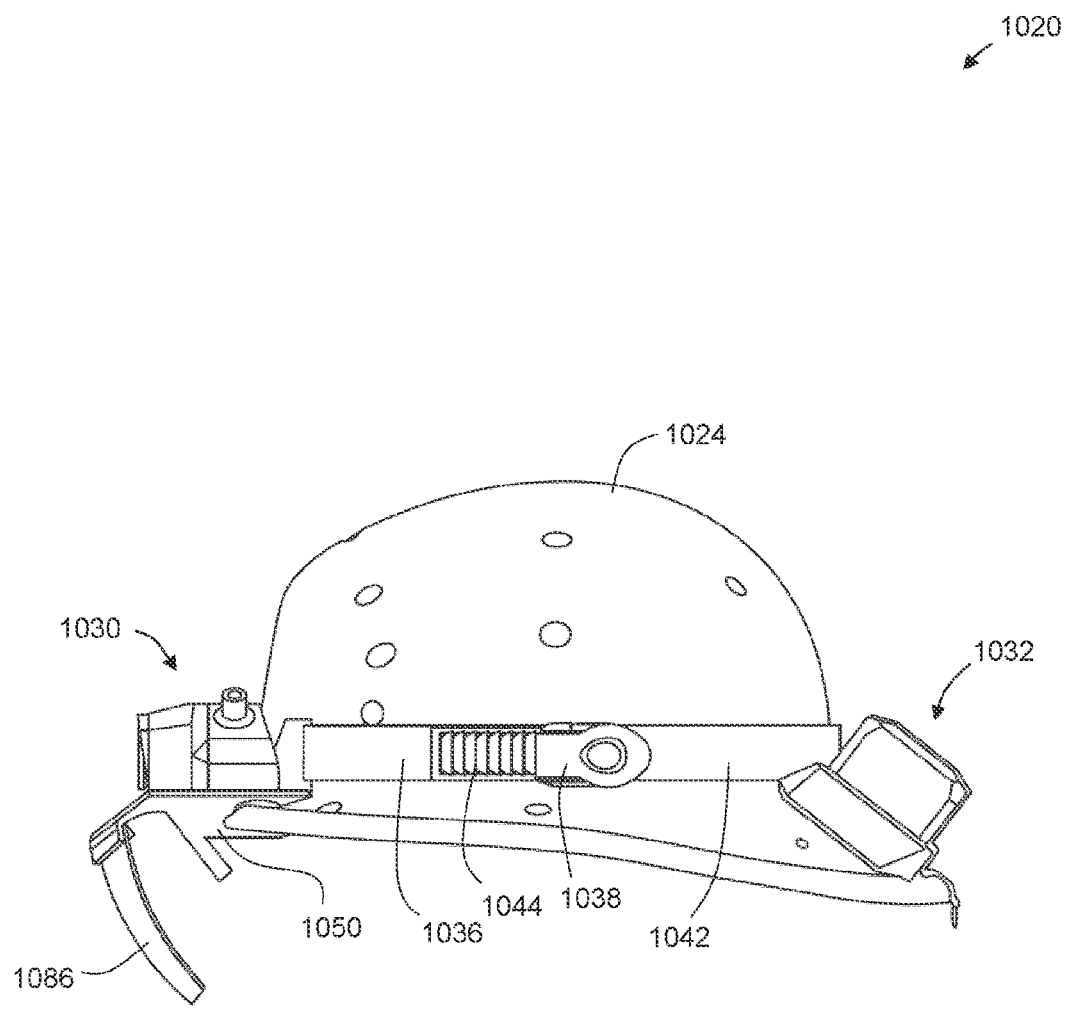
FIG. 17 is a side view of the augmented reality display apparatus of FIG. 15.
Figure 18:
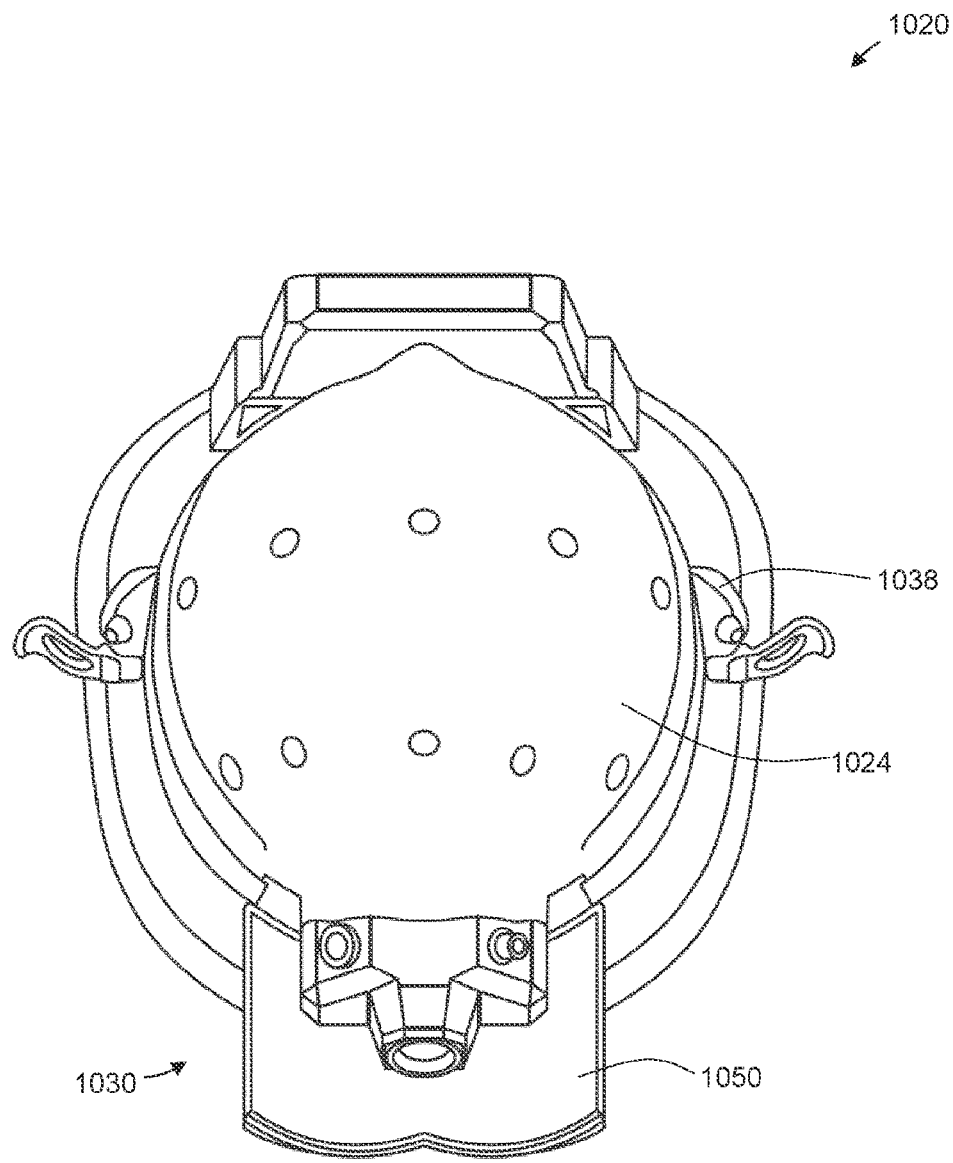
FIG. 18 is a top view of the augmented reality display apparatus of FIG. 15.
Figure 19A:
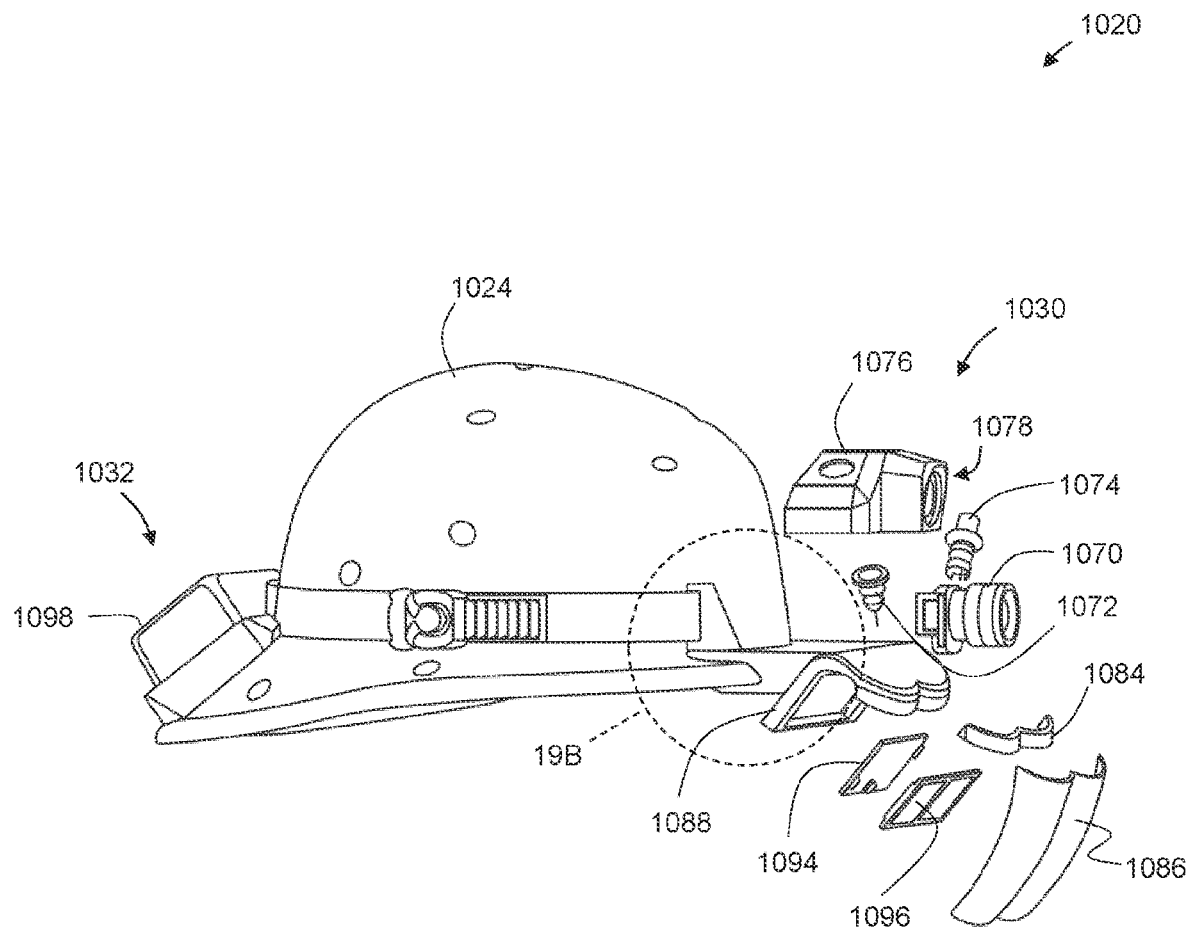
FIG. 19A is an exploded perspective view of the augmented reality display apparatus of FIG. 15.
Figure 19B:
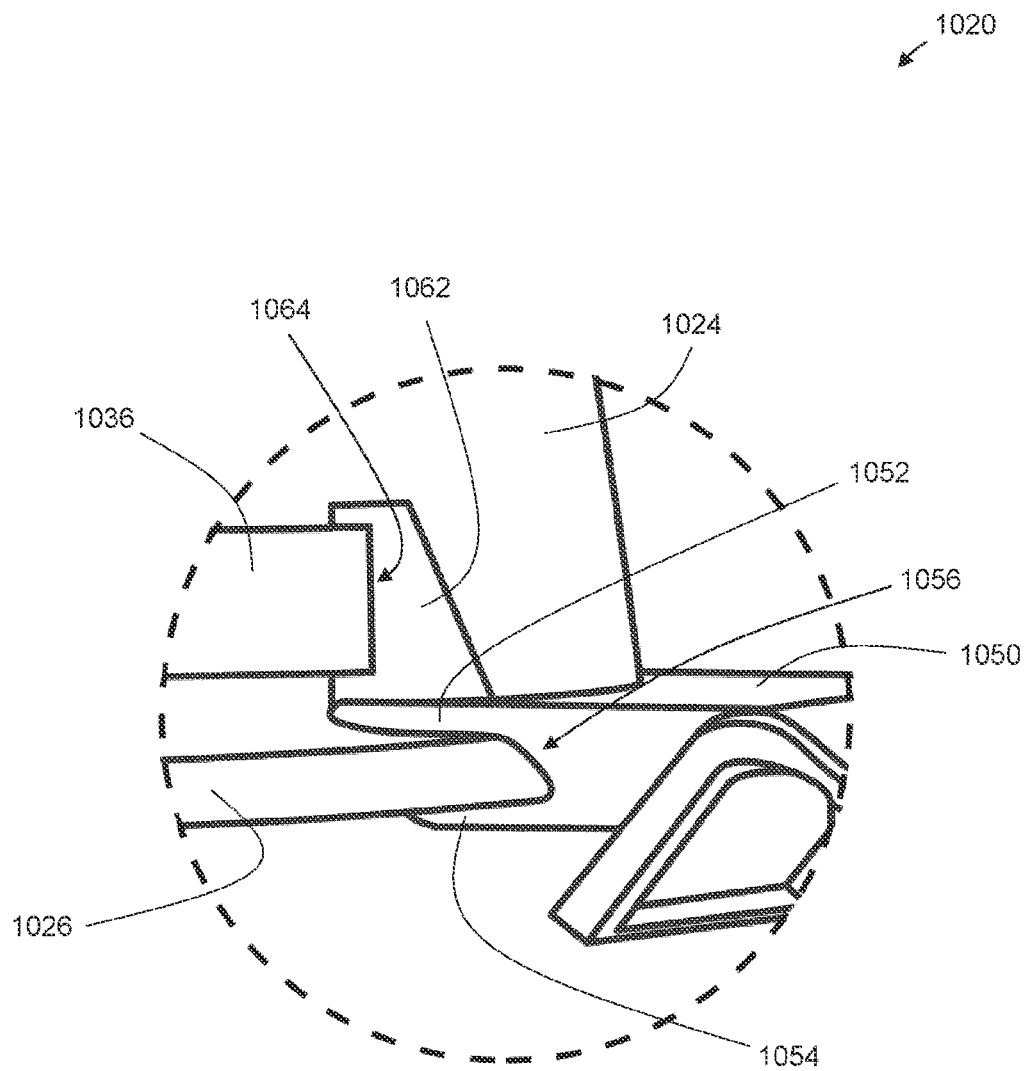
FIG. 19B is an enlarged fragmentary view of a portion of the augmented reality display apparatus indicated in FIG. 19A.

Referring to FIG. 13, shown therein is an exemplary highlighted view 900 of 616. The highlighted view 9800 corresponds to the highlighted view 364 of FIG. 6. Human temperature objects in the highlighted view 900 are highlighted by showing the thermal value for the object within the delineated edge(s) of the object. The human temperature objects (the human 902, the computer 904, the monitor 906 and the lights 908) are seen according to their thermal value and delineated edges. The objects not corresponding to human temperature (the desk 910) are shown as a floating edge 914 with no thermal value (appearing black). Thus, the highlighted view 900 allows a user to see all objects 902, 904, 906, 908, 910 in the environment 912 according to delineated edges, and specifically see human temperature objects 902, 904, 906, 908 according to thermal values. As such, a user seeing the highlighted view 900 can navigate the non-human temperature objects 910 to hone in on the highlighted human temperature objects 902, 904, 906, 908 in the environment 912. To differentiate between highlighted objects that are actually human (the human 902) and those that are not human (the computer 904, the monitor 906 and the lights 908), the shape and position of the object are determinative.

The highlighted view 900 contains a false positive 916. The false positive 916 appears as a completely delineated object with a thermal value extending beyond the periphery of the highlighted view 900. A false positive 916 can be the result of a high temperature object (such as human) in close proximity to the thermal camera (i.e. thermal imaging camera 248 of FIG. 5 or the thermal imaging camera 306 of FIG. 6), at the periphery of the environment 912 and not wholly captured in a single frame of act 602.

The highlighted view 900 contains several artefacts 918. The artefacts 918 appear as diffuse thermal values with no surrounding delineated edge(s). The artefacts 918 are the result of hot air emanating from hot objects, such as the hot air expelled from computer 904 or monitor 906. Objects 902, 904, 906, 910 appearing in the highlighted view 900 as completely delineated objects with a thermal value can be regarded with high confidence as actually being present in the environment 912. With training, a user seeing the highlighted view 900 will be able to identify false positive 916 and artefacts 918 and disregard them from actual objects in the environment 912.

Referring again to FIG. 10, method 600 provides that the highlighted view 900 is output to a display screen (618). The display screen of 618 may be the display screen 368 of FIG. 6, or the display screen 208 of FIGS. 2, 4 and 5. The display screen may be located in a remote location away from the environment the camera is viewing in accordance with an embodiment.

The output of 618 may be switched to show the thermal view 700, the virtual view 800, or the highlighted view 900 as desired by the user, in accordance with an embodiment. Depending on the environment and situation, a user may find viewing the thermal view 700 or virtual view 800 more advantageous than the highlighted view 900. For example, the thermal view 700 is useful for identifying large objects/ obstacles in the environment that are cooler than human temperature and would therefore not be seen (appear black) in the highlighted view.

Turning now to FIGS. 15 to 19, another embodiment of an augmented reality display apparatus is shown and is generally indicated by reference numeral 1020. The augmented reality display apparatus 1020 comprises an augmented reality display device 1022 that is configured to be mounted on a headgear 1024 having a brim 1026 and worn by a user. The augmented reality display device 1022 is configured to display an augmented reality view of the surrounding environment to the user. In the example shown, the headgear 1024 is a firefighter helmet, however it will be understood that the headgear 1024 can be another form of headgear having a brim, such as a military helmet, a construction helmet, a mining helmet, a hat, a cap, and the like.

The augmented reality display device 1022 comprises a display unit 1030 and a processing unit 1032 that are connected to each other by an adjustable strap 1034. The display unit 1030 is configured to be mounted on a forward portion of the headgear 1024 proximate the face of the user, and the processing unit 1032 is configured to be mounted at another position on the headgear 1024. In particular, the processing unit 1032 is typically positioned at a rearmost position on the headgear 1024, diametrically opposite the display unit 1030, to provide balancing of weight of the augmented reality display device 1022 on the headgear 1024.

The length of the adjustable strap 1034 can be varied to enable the augmented reality display device 1022 to be easily fastened and unfastened to headgear of different shapes and sizes. In the example shown, the strap 1034 has a ratcheted buckle configuration, and comprises two (2) first strap portions 1036 connected to the display unit 1030 and each having a releasable buckle 1038 at an end thereof, and a second strap portion 1042 separate from the first strap portions 1036 and connected to the processing unit 1032. The second strap portion 1042 has an array of teeth 1044 disposed along a surface of each end thereof. As will be understood, each buckle 1038 is configured to receive an end of the second strap portion 1042 and engage the teeth 1044 disposed thereon, to allow the length of the adjustable strap 1034 to be secured at a desired length. After use, one or both buckles 1038 can be released to disengage the teeth 1044, to allow the augmented reality display device 1022 to be loosened and separated from the headgear 1024.

The display unit 1030 comprises a base 1050 that is shaped to engage the brim 1026 to enable the display unit 1030, and in turn the augmented reality display device 1022, to be more securely fastened to the headgear 1024. In this embodiment, the base 1050 has a pair of rearwardly-extending tabs, namely an upper tab 1052 and a lower tab 1054, that define a curved groove 1056 therebetween. The groove 1056 is sized and shaped to receive at least a portion of the brim 1026 of the headgear 1024. The base 1050 also has two (2) upwardly extending tabs 1062, each having a slot 1064 formed therein through which a looped end of a respective first strap portion 1036 is connected.

The base 1050 has a forward upper portion that supports a thermal camera 1070, a toggle switch 1072, and a rotary switch 1074. The thermal camera 1070 may be, for example, a Boson™ 320 compact longwave infrared (LWIR) camera manufactured by FLIR Systems Inc., of Wilsonville, Oreg., U.S.A. A removable cover 1076 is disposed on the forward upper portion of the base 1050, and defines an enclosure in which the thermal camera 1070, the toggle switch 1072, and the rotary switch 1074 are at least partially accommodated.

The cover 1076 has a forward window 1078 for the thermal camera 1070, and has apertures through which the toggle switch 1072 and the rotary switch 1074 protrude, to allow each of the switches 1072 and 1074 to be operated by the user. The base 1050 further comprises a scalloped, forwardly-extending tab that is shaped to receive a spacer 1084. A display screen 1086, which is fabricated of generally transparent plastic, is mounted to the base 1050 against the spacer 1084. The display screen 1086 is sized to cover a portion of the face of the user, and specifically the eyes and surrounding area of the face of the user, such that the user's field of view is covered by the display screen 1086 during use. The base 1050 also comprises a downwardly-inclined tab 1088 that defines a recess sized to accommodate a driver board 1094 and an image projector 1096. In this embodiment, the driver board 1094 is a field-programmable gate array (FPGA) configured to process an image frame and generate two (2) paired image frames containing partially overlapping image data, and to output the two (2) paired image frames to the image projector 1096. In this embodiment, the image projector 1096 is a set of two (2) liquid crystal displays (LCDs), and each LCD of the two (2) LCDs of the image projector 1096 is configured to display a respective one (1) of the paired image frames. Each LCD may be, for example, a 1.95 inch 320 (RGB)×480 colour display (model no. ET020HV03-OT) manufactured by Hong Kong Eurotech Electronics Co., Ltd., of Shenzen, China. The image frames displayed by the image projector 1096 in turn illuminate (or in other words, are "projected onto") the display screen 1086, where they are reflected and thereby appear within the field of view of the user to create the augmented reality view.

Turning now to the processing unit 1032, the processing unit 1032 comprises a housing 1098 that encloses processing structure 1100, a digital gyroscope 1102, a wireless transceiver 1104, and a battery 1106. The processing structure 1100 comprises one or more processors (not shown) that are in communication with each other, and which are in communication with memory 1108, all of which are mounted on or more boards (not shown). The processing structure 1100 may comprise, for example, an ARM™ Cortex-A53 processor designed by Arm Holdings of Cambridge, United Kingdom. The digital gyroscope 1102 is configured to output a digital orientation signal to the processing structure 1100, which in turn is configured to process the digital orientation signal and to generate a compass heading indicator to be overlaid on one or more image frames. The digital gyroscope may be, for example, a BMI160™ low power inertial measurement unit (IMU) manufactured by Bosch Sensortec GmbH of Reutlingen, Germany. As will be appreciated, such a compass heading indicator can be beneficial in situations where poor visibility can otherwise disorient the user. The wireless transceiver 1104 is configured to wirelessly transmit image frames to a remote location, such as for example a command center for viewing by other parties, and/or or to a remote server for storage, and the like. The wireless transceiver 1104 may be configured to wirelessly communicate using any of Ethernet, Wi-Fi™, Bluetooth™ and the like. The battery 1106 comprises one or more rechargeable cells (not shown), and is configured to power the electronic components of the augmented reality display device 1022.

The processing structure 1100 is in communication with the thermal camera 1070, the toggle switch 1072, and the rotary switch 1074, and the driver board 1094, via wired communication through a cable 1112 extending between the processing unit 1032 and the display unit 1030. The cable 1112 enables signals and/or image data to be conveyed from the thermal camera 1070, the toggle switch 1072, and the rotary switch 1074 to the processing structure 1100, and from the processing structure 1100 to the driver board 1094. The cable 1112 is also configured to supply power to the components of the display unit 1030.

The processing structure 1100 runs an image processing program that effectively provides a plurality of image processing modules, which are similar to those described above for processing system 300 with reference to FIG. 6. During operation, the processing structure 1100 continuously receives image data from the thermal camera 1070 as a sequence of captured image frames. The image processing program running on the processing structure 1100 provides a capture module, which processes each image frame received from the thermal camera 1070 to obtain a thermal value for each pixel location. The capture module then stores the thermal values and their pixel locations in memory 1108, and generates a thermal image frame (referred to herein as a "thermal view") having a compass heading indicator determined from the signal output by the digital gyroscope 1102 overlaid on the thermal values at their pixel locations. The "thermal view" is stored in memory 1108 until the next captured image frame is received by the capture module.

The image processing program running on the processing structure 1100 provides an edge detection module, which is configured to retrieve the thermal view from memory 1108, and to process the thermal view to identify edges of objects appearing in the image by using a two-dimensional Laplacian filter. The edge detection module then stores the pixel locations corresponding to the edges as edge data in the memory 1108, until the next captured image frame is received by the capture module.

The image processing program running on the processing structure 1100 provides a virtual view module, which is configured to retrieve the edge data from the memory 1108, and to generate an edge image frame comprising only the edge data (and a compass heading indicator determined from the signal output by the digital gyroscope 1102 overlaid thereon), referred to herein as a "virtual view". As will be understood, the "virtual view" is a representation of only the identified edges of objects, and therefore pixel locations not deemed to be edges by the edge detection module appear as dark in the "virtual view". Each "virtual view" is stored in memory 1108, until the next captured image frame is received by the capture module.

The image processing program running on the processing structure 1100 provides an overlay module, which is configured to retrieve the thermal view and the edge data from the memory 1108, and to overlay the edge data on the "thermal view" to produce a combined thermal image frame including edges (with a compass heading indicator determined from the signal output by the digital gyroscope 1102 overlaid thereon), referred to herein as a "fusion view". As will be understood, the "fusion view" includes edges overlaid on the thermal image data represented by the thermal value at each pixel location. Each "fusion view" is stored in memory 1108 until the next captured image frame is received by the capture module.

The image processing program running on the processing structure 1100 provides an overlay module, which is configured to retrieve the "fusion view" from memory 1108 and to process the "fusion view" to identify objects appearing in the image. In particular, the overlay module identifies objects by finding groups of pixels that are surrounded by an unbroken (i.e. continuous) perimeter of edges. The pixel locations corresponding to the objects identified by the edge detection module are stored as object data in the memory 1108, and are retained until the next captured image frame is received by the capture module.

The image processing program running on the processing structure 1100 provides a measurement module, which is configured to retrieve the "thermal view" and the object data from the memory 1108. The measurement module determines an object thermal value for each object defined in the object data, by calculating the mean of the thermal values for the pixel locations associated with that object. The object thermal values and their pixel locations are stored in the memory 1108 as object thermal value data, where they are retained until the next captured image frame is received by the capture module.

The image processing program running on the processing structure 1100 provides a comparison module 354, which is configured to store a threshold intensity value in memory 1108. Upon receiving input from the rotary switch 1074, the comparison module either increases or decreases the threshold intensity value in accordance with the input, and stores the adjusted threshold intensity value in memory 1108 as the threshold intensity value. As will be appreciated, the user may desire to adjust the threshold intensity value through operation of the rotary switch 1074 to set the threshold intensity value to correspond to human body temperature, for example, or to another temperature of significance. The comparison module is also configured to retrieve the object thermal value data from the memory 1108, and compare each object thermal value to the threshold value. If the object thermal value for an object is equal or substantially equal to the threshold value, the object is deemed to be a threshold temperature object. The comparison module stores the pixel locations associated with each threshold temperature object as threshold temperature object data in memory 1108, until the next captured image frame is received by the capture module.

The image processing program running on the processing structure 1100 provides a highlighting module, which is configured to retrieve the object thermal values, the edge data and threshold temperature object data from the memory 1108, and to overlay the edge data and the object thermal value data at pixel locations associated with each threshold temperature object, to produce a threshold object thermal image frame including edges (and with a compass heading indicator determined from the signal output by the digital gyroscope 1102 overlaid thereon), referred to herein as a "highlighted view". Each "highlighted view" is stored in memory 1108 until the next captured image frame is received by the capture module.

The image processing program running on the processing structure 1100 also provides a display module, which is configured to store a display mode value in memory 1108. In this embodiment, the available display mode values are virtual view, fusion view, and highlighted view, which are stored as a repeating sequence. Upon receiving input from the toggle switch 1072, the comparison module cycles to the next display mode value in the sequence, and stores the updated display mode value in memory 1108 as the display mode value. Additionally, the display module is configured to output the image frame associated with the current display mode value to the driver board 1094.

Upon receiving the image frame, the driver board 1094 processes the image frame into two (2) paired image frames containing partially overlapping image data, and outputs the two (2) paired image frames to the image projector 1096. The image projector 1096 then displays the two (2) paired image frames, with each LCD displaying a respective one (1) of the paired image frames. The image frames displayed by the image projector 1096 in turn illuminate (or in other words, are "projected onto") the display screen 1086, where they are reflected and thereby appear within the field of view of the user to create the augmented reality view.

In other embodiments, the augmented reality display device may be differently configured. For example, although in the embodiment described above, the thermal camera 1070, the driver board 1094, the image projector 1096 and the display screen 1086 are fixedly mounted on the base 1050, and therefore are fixedly mounted relative to the at least one feature of the processing unit 1030 engaging the headgear 1024 (namely, the upper tab 1052 and the lower tab 1054, which define the curved groove 1056 that receives at least a portion of the brim 1026), in other embodiments, other configurations are possible. For example, in other embodiments, the display screen may be translatably moveable relative to a base comprising upper and lower tabs defining a groove for receiving a portion of the brim, via a translatably moveable assembly, such as for example an assembly similar to display mount 216 and parallel arms 218 described above and with reference to FIGS. 2 and 4. In one such embodiment, the thermal camera, the driver board, the image projector and the display screen are all translatably connected relative to a base (comprising upper and lower tabs defining a groove for receiving a portion of the brim) via a linkage arm assembly. In a related embodiment, the translatably moveable assembly may comprise a four-bar linkage. It will be appreciated that in such embodiments, the augmented reality device or apparatus is compatible with a SCBA mask worn by the user, whereby the translatable connection allows at least the display screen to be moved into and out of position to accommodate the SCBA mask. In one such embodiment, the translatable connection allows the thermal camera, the driver board, the image projector and the display screen to all be moved into and out of position in unison to accommodate the SCBA mask.

Although in the embodiment described above, the strap 1034 comprises two (2) first strap portions 1036 and a second strap portion 1042 that are configured to be connected to each other by buckles, in other embodiments, the strap may be differently configured. For example, the strap may comprise a single first strap portion, or more than two second strap portions, or only a single portion. Rather than having a ratcheted buckle configuration, one or more ends of the strap may alternatively be fastenable by one or more clips; one or more hooks; one or more belt buckles; one or more hook-and-loop connectors, and the like. The strap may be fabricated of a resilient and/or stretchable material. In one such embodiment, the strap fabricated of the resilient and/or stretchable material may alternatively comprise no fasteners.

Although in the embodiment described above, the base 1050 has two (2) upwardly extending tabs 1062, each having a slot 1064 formed therein through which a looped end of a respective first strap portion 1036 is connected, in other embodiments, the strap may alternatively comprise only a single forward portion and the base may alternatively have only a single tab having only one slot through which the forward portion of the strap is accommodated. Still other connection configurations between the strap(s) and base are possible.

The display unit 1030 comprises a base 1050 that is shaped to engage the brim 1026 to enable the display unit 1030, and in turn the augmented reality display device 1022, to be more securely fastened to the headgear 1024. In this embodiment, the base 1050 has a pair of rearwardly-extending tabs, namely an upper tab 1052 and a lower tab 1054, that define a curved groove 1056 therebetween. The groove 1056 is sized and shaped to receive at least a portion of the brim 1026 of the headgear 1024. The base 1050 also has two (2) upwardly extending tabs 1062, each having a slot 1064 formed therein through which a looped end of a respective first strap portion 1036 is connected.

Although in the embodiment described above, the cable 1112 is shown as being separate from the adjustable strap 1034, in other embodiments, the strap and cable may be configured such that the strap is hollow along at least a portion of its length, and the cable is incorporated within the hollow portion of the strap.

Although in the embodiment described above, the augmented reality display device 1022 does not comprise a GPS transceiver, in other embodiments, the augmented reality display device may alternatively comprise a GPS transceiver located within the processing unit, with the GPS transceiver having similar or identical function to GPS transceiver 280 described above and with reference to FIGS. 2 and 4.

Although embodiments have been described above with reference to the accompanying drawings, those of skill in the art will appreciate that variations and modifications may be made without departing from the scope thereof as defined by the appended claims.

What is claimed is:

1. An augmented reality display device, comprising:
   at least one mounting feature for engaging a headgear;
   a thermal camera configured to capture image frames;
   processing structure in communication with the thermal camera, the processing structure being configured to:
      process the captured image frames to obtain a thermal value for each pixel location within the captured image frame,
      process thermal image frames using a filter to identify pixel locations corresponding to edges of objects,
      store the pixel locations corresponding to the edges of the objects as edge data,
      process the edge data to identify object locations surrounded by continuous perimeters of edges,
      store the object locations as object data, and
      output processed image frames based on the thermal values and the edge data;
   a battery;
   an image projector in communication with the processing structure, the image projector configured to display the processed image frames; and
   a display screen, the display screen being translatably moveable relative to the at least one feature for engaging the headgear,
   wherein the device further comprises a rotary switch in communication with the processing structure, the rotary switch configured to receive a user input, wherein the processing structure is further configured to:
      process the object data and the thermal value for each pixel location to determine an object thermal value for each said object,
      establish a threshold intensity value based on the user input, and
      store the pixel locations for the object thermal values equal to the threshold intensity value as threshold temperature object data.

2. The augmented reality display device of claim 1, further comprising:
   a base shaped to engage the headgear; and
   a moveable assembly connected to the base, the moveable assembly having the display screen connected thereto.

3. The augmented reality display device of claim 2, wherein the moveable assembly comprises a linkage arm assembly.

4. The augmented reality display device of claim 1, wherein the thermal camera, the at least one mounting feature for engaging the headgear, the image projector and the display screen are accommodated within a display module, wherein the processing structure and the battery are accommodated within a processing unit, and further comprising:
   a strap connecting the display unit and the processing unit.

5. The augmented reality display device of claim 4, wherein the strap is an adjustable strap having an adjustable length.

6. The augmented reality display device of claim 5, wherein the adjustable strap comprises a first strap portion connected to the display unit, and a second strap portion connected to the processing unit.

7. The augmented reality display device of claim 1, further comprising a digital gyroscope outputting a signal to the processing structure, the processing structure processing the signal and providing a compass heading indicator in the processed image frames.

8. An augmented reality display apparatus, comprising:
   a headgear having a brim; and
   an augmented reality display device having at least one mounting feature engaging the brim, the augmented reality display device comprising:
   a thermal camera configured to capture image frames,
   an image projector,
   a display screen,
   processing structure in communication with the thermal camera and the image projector, the processing structure being configured to:
      process the captured image frames to obtain a thermal value for each pixel location within the captured image frame,
      process thermal image frames using a filter to identify pixel locations corresponding to edges of objects,
      store the pixel locations corresponding to the edges of the objects as edge data,
      process the edge data to identify object locations surrounded by continuous perimeters of edges,
      store the object locations as object data, and
      output processed image frames to the image projector based on the thermal values and the edge data; and
   a battery,
   the display screen being moveable relative to the at least one mounting feature engaging the brim,
   wherein the device further comprises a rotary switch in communication with the processing structure, the rotary switch configured to receive a user input, wherein the processing structure is further configured to:
      process the object data and the thermal value for each pixel location to determine an object thermal value for each said object,
      establish a threshold intensity value based on the user input, and
      store the pixel locations for the object thermal values equal to the threshold intensity value as threshold temperature object data.

9. The augmented reality display device of claim 1, wherein the processing structure is further configured to:
   generate edge image frames comprising only the edge data;
   output the edge image frames as the processed image frames.

10. The augmented reality display device of claim 1, wherein the processing structure is further configured to:
    generate threshold object thermal image frames comprising the edge data and the object thermal value data overlaid at pixel locations associated with each threshold temperature object; and
    output the threshold object thermal image frames as the processed image frames.

11. The augmented reality display apparatus of claim 8, wherein the processing structure is further configured to:
    generate edge image frames comprising only the edge data;
    output the edge image frames as the processed image frames.

12. The augmented reality display apparatus of claim 8, wherein the processing structure is further configured to:
    generate threshold object thermal image frames comprising the edge data and the object thermal value data overlaid at pixel locations associated with each threshold temperature object; and
    output the threshold object thermal image frames as the processed image frames.

* * * * *